United States Patent
Jackson et al.

(10) Patent No.: US 12,458,168 B2
(45) Date of Patent: *Nov. 4, 2025

(54) SINGLE OPENING VENT FOR STEAM AIR FRYER

(71) Applicant: SharkNinja Operating LLC, Needham, MA (US)

(72) Inventors: Roger Neil Jackson, Cornwall (GB); Oliver Thomas Joyce, London (GB); Nicholas Christo, Mansfield, MA (US); Adam Garland, Wakefield, MA (US)

(73) Assignee: SharkNinja Operating LLC, Needham, MA (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/956,193

(22) Filed: Sep. 29, 2022

(65) Prior Publication Data

US 2023/0218110 A1 Jul. 13, 2023

Related U.S. Application Data

(63) Continuation of application No. 17/731,916, filed on Apr. 28, 2022, now Pat. No. 11,490,761.
(Continued)

(51) Int. Cl.
*A47J 36/38* (2006.01)
*A47J 27/04* (2006.01)
(Continued)

(52) U.S. Cl.
CPC .............. *A47J 36/38* (2013.01); *A47J 27/04* (2013.01); *A47J 36/06* (2013.01); *A47J 37/0641* (2013.01);
(Continued)

(58) Field of Classification Search
CPC .... A47J 36/38; A47J 36/06–066; A47J 27/04; A47J 37/101; A47J 37/103;
(Continued)

(56) References Cited

U.S. PATENT DOCUMENTS 7,964,824 B2 6/2011 Moon
8,330,083 B2 12/2012 Moon et al.
(Continued)

FOREIGN PATENT DOCUMENTS

AU 2015347440 B2 11/2018
AU 2018204328 B2 10/2019
(Continued)

*Primary Examiner* — John J Norton
(74) *Attorney, Agent, or Firm* — Mintz, Levin, Cohn, Ferris, Glovsky and Popeo, P.C.

(57) ABSTRACT

A cooking system is provided. The cooking system includes a housing, a lid, a heating element, a vent tube, and a piston. The housing has a hollow interior. The lid is movable relative to the housing, where the lid and housing cooperate to form a cooking chamber. The heating element is mounted within the lid. The vent tube is arranged within the lid and extends between the cooking chamber and an external environment. The vent tube includes an inlet channel, an outlet channel, and a central channel arranged between the inlet and outlet channel. A piston is arranged within the central channel and configured to alternate between a venting and a non-venting position such that a low-moisture fluid is drawn through the inlet channel into the cooking chamber from the external environment, and a high-moisture fluid is evacuated through the outlet channel into the external environment from the cooking chamber.

17 Claims, 14 Drawing Sheets

Related U.S. Application Data

(60) Provisional application No. 63/266,753, filed on Jan. 13, 2022.

(51) Int. Cl.
*A47J 36/06* (2006.01)
*A47J 37/06* (2006.01)

(52) U.S. Cl.
CPC ...... *A47J 37/0664* (2013.01); *A47J 2027/043* (2013.01)

(58) Field of Classification Search
CPC .. A47J 37/128; A47J 37/0641; A47J 37/0664; A47J 2027/043
See application file for complete search history.

(56) References Cited

U.S. PATENT DOCUMENTS

| | | |
|---|---|---|
| 8,651,535 B2 | 2/2014 | Oppel et al. |
| 8,835,810 B2 | 9/2014 | Moon |
| 9,226,343 B2 | 12/2015 | Moon et al. |
| 9,372,002 B2 | 6/2016 | Harward et al. |
| 9,486,099 B2 | 11/2016 | Valance |
| 9,648,667 B2 | 5/2017 | Moon et al. |
| 10,082,303 B2 | 9/2018 | Choi et al. |
| 10,098,187 B2 | 10/2018 | Moon et al. |
| 10,119,312 B2 | 11/2018 | Wang |
| 10,502,433 B2 | 12/2019 | Park et al. |
| 10,508,816 B2 | 12/2019 | Tian et al. |
| 10,619,866 B2 | 4/2020 | Janesky |
| 10,653,270 B2 | 5/2020 | Gill et al. |
| 11,022,321 B1 | 6/2021 | Bhogal et al. |
| 11,388,787 B2 | 7/2022 | Carcano et al. |
| 11,490,761 B1 * | 11/2022 | Jackson ............... A47J 36/38 |
| 2002/0117162 A1 | 8/2002 | Bassoli et al. |
| 2019/0069719 A1 | 3/2019 | Huang et al. |
| 2019/0142216 A1 | 5/2019 | Huang et al. |
| 2019/0178015 A1 | 6/2019 | Wang |
| 2019/0298105 A1 | 10/2019 | Floessholzer |
| 2020/0170437 A1 | 6/2020 | Anthony et al. |
| 2020/0187708 A1 | 6/2020 | Samonigg et al. |
| 2020/0205596 A1 | 7/2020 | Chen |
| 2020/0229637 A1 | 7/2020 | Han et al. |
| 2020/0229640 A1 | 7/2020 | Han et al. |
| 2020/0260902 A1 | 8/2020 | Nam et al. |
| 2020/0267806 A1 | 8/2020 | Nam et al. |
| 2020/0405086 A1 | 12/2020 | Dos Santos et al. |
| 2021/0010677 A1 | 1/2021 | Johnson et al. |
| 2021/0076873 A1 | 3/2021 | Wei |
| 2021/0121011 A1 | 4/2021 | Elliston et al. |
| 2021/0137299 A1 | 5/2021 | Moon et al. |
| 2021/0137300 A1 | 5/2021 | Moon et al. |
| 2021/0180797 A1 | 6/2021 | Bhogal et al. |
| 2021/0186250 A1 | 6/2021 | Kim et al. |
| 2021/0254834 A1 | 8/2021 | Bhogal et al. |
| 2022/0039585 A1 | 2/2022 | Hensley et al. |
| 2022/0053971 A1 | 2/2022 | Alexander et al. |
| 2022/0099641 A1 | 3/2022 | Desrochers |
| 2022/0307756 A1 | 9/2022 | Scalf et al. |
| 2022/0322874 A1 | 10/2022 | Marsh-Croft et al. |
| 2023/0031394 A1 * | 2/2023 | Li ..................... A47J 27/086 |
| 2023/0101591 A1 * | 3/2023 | Doat ..................... A47J 27/08 219/440 |

FOREIGN PATENT DOCUMENTS

| | | | |
|---|---|---|---|
| CA | 2537918 A1 | 8/2006 |
| CA | 2780642 C | 11/2017 |
| CA | 3034899 A1 | 3/2018 |
| CN | 202262349 U | 6/2012 |
| CN | 103233634 A | 8/2013 |
| CN | 104196363 A | 12/2014 |
| CN | 102960055 B | 4/2016 |
| CN | 103120540 B | 8/2016 |
| CN | 103233634 B | 11/2016 |
| CN | 206026097 U | 3/2017 |
| CN | 106948687 A | 7/2017 |
| CN | 107339021 A | 11/2017 |
| CN | 107510379 A | 12/2017 |
| CN | 108413449 A | 8/2018 |
| CN | 108784414 A | 11/2018 |
| CN | 109090989 A | 12/2018 |
| CN | 109414137 A | 3/2019 |
| CN | 109452857 A | 3/2019 |
| CN | 208598208 U | 3/2019 |
| CN | 106948687 B | 7/2019 |
| CN | 110051214 A | 7/2019 |
| CN | 209186439 U | 8/2019 |
| CN | 110464207 A | 11/2019 |
| CN | 110652169 A | 1/2020 |
| CN | 105605686 B | 3/2020 |
| CN | 111236774 A | 6/2020 |
| CN | 111270917 A | 6/2020 |
| CN | 108413449 B | 7/2020 |
| CN | 111449531 A | 7/2020 |
| CN | 111449532 A | 7/2020 |
| CN | 111449533 A | 7/2020 |
| CN | 110250937 B | 9/2020 |
| CN | 211582724 U | 9/2020 |
| CN | 107110526 B | 12/2020 |
| CN | 112137401 A | 12/2020 |
| CN | 212394642 U | 1/2021 |
| CN | 212394643 U | 1/2021 |
| CN | 212630595 U | 3/2021 |
| CN | 212996087 U | 4/2021 |
| CN | 112796569 A | 5/2021 |
| CN | 213129184 U | 5/2021 |
| CN | 213464721 U | 6/2021 |
| CN | 111270917 B | 7/2021 |
| CN | 113116134 A | 7/2021 |
| CN | 111236774 B | 8/2021 |
| CN | 213993316 U | 8/2021 |
| CN | 113455891 A | 10/2021 |
| CN | 113455920 A | 10/2021 |
| CN | 113491439 A | 10/2021 |
| CN | 113520154 A | 10/2021 |
| CN | 113925360 A | 1/2022 |
| DE | 386368 C | 6/1923 |
| DE | 3715599 A1 | 11/1988 |
| EP | 0290925 A2 | 11/1988 |
| EP | 0290925 B1 | 7/1991 |
| EP | 1418385 A2 | 5/2004 |
| EP | 1631175 A2 | 3/2006 |
| EP | 1631175 B1 | 3/2009 |
| EP | 2068088 A2 | 6/2009 |
| EP | 1418385 B1 | 12/2009 |
| EP | 2572583 A1 | 3/2013 |
| EP | 2821710 A1 | 1/2015 |
| EP | 2594169 B1 | 4/2015 |
| EP | 2068088 B1 | 6/2015 |
| EP | 2572583 B1 | 2/2016 |
| EP | 2821710 B1 | 5/2016 |
| EP | 2697569 B1 | 7/2017 |
| EP | 3186563 A1 | 7/2017 |
| EP | 3338603 A1 | 6/2018 |
| EP | 3471569 A1 | 4/2019 |
| EP | 3338603 B1 | 8/2019 |
| EP | 3186563 B1 | 3/2020 |
| EP | 3614892 A1 | 3/2020 |
| EP | 3756514 A1 | 12/2020 |
| EP | 3698681 B1 | 11/2021 |
| EP | 3698683 B1 | 11/2021 |
| EP | 3909480 A1 | 11/2021 |
| EP | 3324129 B1 | 2/2022 |
| WO | 9600027 A1 | 1/1996 |
| WO | 2004110229 A2 | 12/2004 |
| WO | 2020000911 A1 | 1/2020 |
| WO | 2020134087 A1 | 7/2020 |
| WO | 2020171421 A1 | 8/2020 |
| WO | 2021061766 A1 | 4/2021 |
| WO | 2022206621 A1 | 10/2022 |

\* cited by examiner

SINGLE OPENING VENT FOR STEAM AIR FRYER

CROSS-REFERENCE TO RELATED APPLICATIONS

This application is a Continuation of U.S. patent application Ser. No. 17/731,916 filed Apr. 28, 2022 and entitled "SINGLE OPENING VENT FOR STEAM AIR FRYER", which claims priority to U.S. Provisional Patent Application No. 63/266,753 filed Jan. 13, 2022 and entitled "SINGLE OPENING VENT FOR STEAM AIR FRYER," the entire contents of which are hereby expressly incorporated by reference herein.

FIELD

The present application generally relates to a single opening vent for steam air fryer devices.

BACKGROUND

Conventional cooking devices, such as pressure cookers and air fryers, each perform a single cooking operation, and as such, these devices employ different components and methods for cooking food items. As such, multiple devices are required to perform various cooking operations. For consumers that wish to enjoy food cooked in different ways via different operations, an accumulation of these devices can occur. For example, a consumer may have a steam cooker for cooking food while keeping it moist, and a separate air fryer to cook the food in order to achieve a desired level of crisp on the outer surface of the food. Such an accumulation of cooking devices is often prohibitive from a standpoint of cost and storage space.

Combination cookers, such as those that can perform both steaming and air frying operations, have been developed, however these devices require an evacuation of the moisture within the device prior to air frying, as the air frying process requires a low moisture environment. As such, vents must be arranged on the device in order to evacuate the high moisture air and replace the evacuated air with low moisture air. In order to ensure that high moisture air being evacuated is not drawn back into the device, inlet and outlet ports must be positioned a distance apart from one another, leading to an increase in complexity and costs to ensure a steady state flow between the inlet port and the outlet port.

For at least these reasons, a cooking device is provided having an integrated inlet port and outlet port that prevents the risk of high moisture air being drawn back into the device.

SUMMARY

Cooking systems for cooking food are provided.

In one embodiment, a cooking system is provided having a housing with a hollow interior, and a lid movable relative to the housing such that the lid and the housing cooperate to form a cooking chamber. A heating element can be mounted within the lid. A vent tube can be arranged within the lid and can extend between the cooking chamber and an external environment. The vent tube can include an inlet channel, an outlet channel, and a central channel arranged between the inlet channel and outlet channel. A piston can be arranged within the central channel and it can be configured to alternate between a venting and a non-venting position such that a low-moisture fluid is drawn through the inlet channel into the cooking chamber from the external environment, and high-moisture fluid is evacuated through the outlet channel into the external environment from the cooking chamber.

The vent tube can have a variety of configurations. For example, in some embodiments, the low-moisture fluid can be drawn into the vent tube in a first direction, and the high-moisture fluid can be evacuated through the vent tube in a second direction that differs from the first direction. In some embodiments, the inlet channel can be arranged on an opposite side of the vent tube relative to the outlet channel. In other embodiments, the low-moisture fluid passing through an inlet opening of the inlet channel can be perpendicular to the high-moisture fluid passing through the outlet channel. In certain embodiments, an inlet opening of the inlet channel can be positioned non-adjacent to the outlet channel.

In some embodiments, a plate can be connected to an end of the piston. In other embodiments, the cooking system can be operable in a plurality of cooking modes including a first cooking mode and a second cooking mode. The first cooking mode can be a wet cooking mode and the second cooking mode can be a dry cooking mode. In some embodiments, in the first cooking mode, the plate can contact a sealing member arranged on an internal surface of the lid. In certain embodiments, in the first cooking mode, the cooking system can be operable as a steam cooker. In some embodiments, in the second cooking mode, a gap can be arranged between the plate and a sealing member arranged on an internal surface of the lid. In certain embodiments, in the second cooking mode, the heating element can heat a flow of air circulating within the cooking chamber. In other embodiments, in the second cooking mode, the cooking system can be operable as an air fryer. In some embodiments, the heating element can be operable in both the first cooking mode and the second cooking mode.

In another embodiment, a cooking system is provided having a housing with a hollow interior. A lid can be movable relative to the housing such that the lid and the housing can cooperate to form a cooking chamber. A heating element can be mounted within the lid. A switching mechanism can be positioned on the lid and it can be configured to alternate between a first position and a second position. A vent tube can be arranged within the lid and it can extend between the cooking chamber and an external environment. A piston can be arranged within the vent tube and it can be configured to alternate between a venting position and a non-venting position. A linkage can extend from the switching mechanism to the piston within the lid. The linkage can be configured to transform a rotational force applied to the switching mechanism to a linear force configured to be applied to the piston.

The piston can have a variety of configurations. For example, in some embodiments, the piston can be configured to move linearly within the vent tube. In other embodiments, the piston can be in the non-venting positon when the switching mechanism is in the first position. In other embodiments, the piston can be in the venting position when the switching mechanism is in the second position. In certain embodiments, the piston can include a projection extending outward from the vent tube and configured to couple to the linkage.

In some embodiments, the linkage can be spring-biased to keep the switching mechanism in the first position.

In some embodiments, a micro switch can be positioned within the lid between the switch and the vent tube. In other embodiments, the micro switch can be configured to be activated with the switching mechanism in one of the first position and the second position. In certain embodiments, the micro switch can be connected to a processor configured to operate a user interface arranged on the housing.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
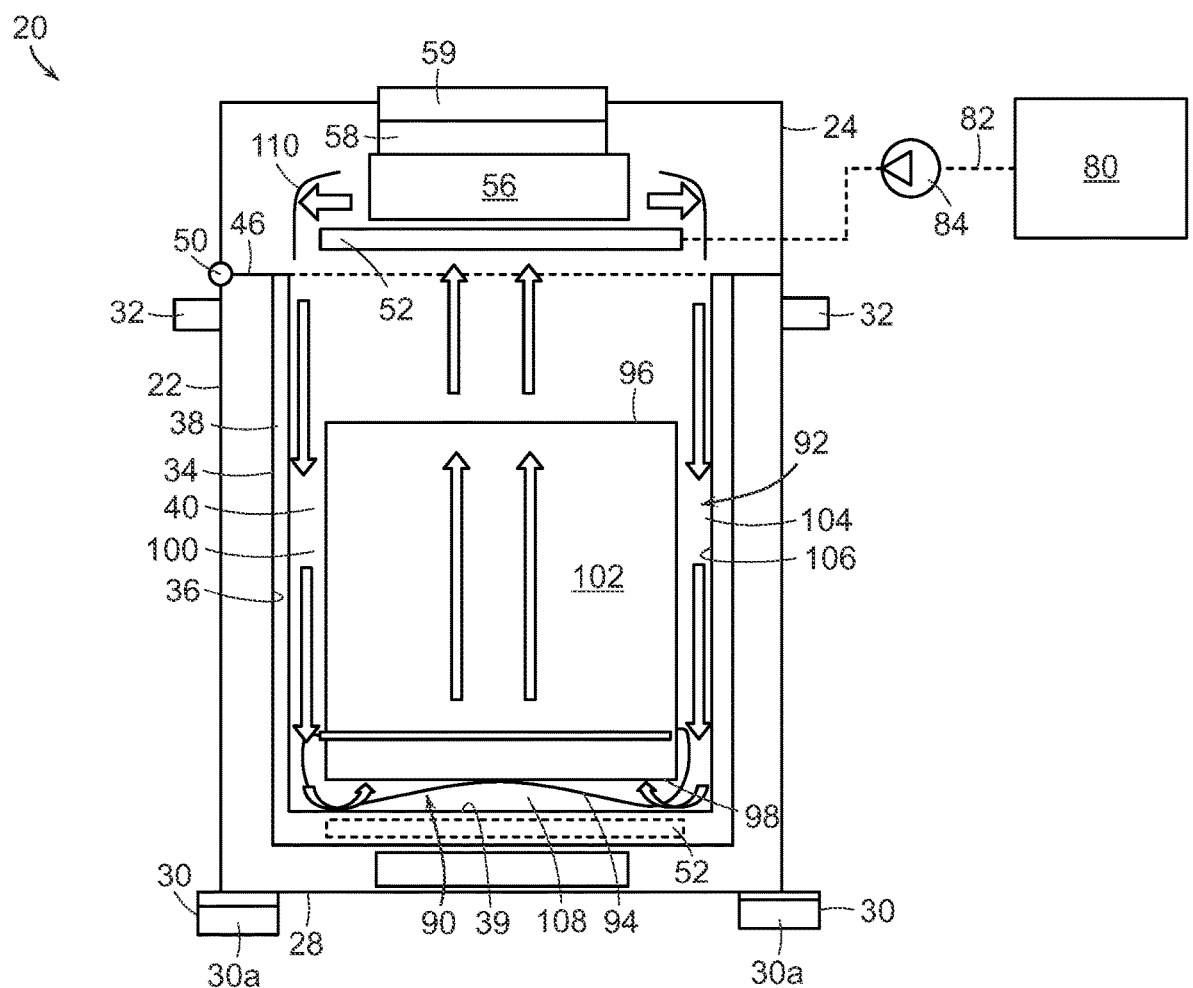
FIG. 1 is a schematic diagram of a cooking system according to one embodiment.

A cooking device is provided having multiple cooking modes and a single vent. In an exemplary embodiment, the cooking device includes a steam cooking mode and an air fry cooking mode, and the device can be configured to transition from the steam cooking mode to the air fry cooking mode during a single cooking operation. In order to switch from a steam mode to an air fry mode during a single cooking process, the moisture level within the cooking compartment must be reduced and thus moist air must be released. It is important when evacuating high-moisture air to ensure that the moist air is not drawn back into the device. Accordingly, a single vent is provided that is configured to allow for the ingress of ambient fluid, such as air, into an internal volume of the housing, and the egress of steam and/or heated fluid from within the internal volume of the housing during or at the completion of a cooking process FIG. 1 illustrates one exemplary embodiment of a cooking system 20 configured to perform multiple cooking operations. As shown, the cooking system 20 generally includes a housing 22 and a lid 24 permanently or removably attached, such as hinged for example, to the housing 22. In the illustrated embodiment, the connection or hinge area between the lid 24 and the housing 22 occurs at an upper portion of the housing 22. A bottom 28 of the housing 22 of the cooking system 20 may be supported on a surface by one or more feet 30, which may include shock absorbing pads 30*a* (of a material such as but not limited to rubber) at a bottom surface thereof. In the illustrated embodiment, the housing 22 includes two feet 30 arranged on opposing sides of the housing 22. However, it should be understood that a housing 22 having any suitable number of feet 30 is within the scope of the disclosure.

In the illustrated embodiment, one or more handles 32 extend outwardly from the exterior of the housing 22 to provide a user with a location to more easily grasp the cooking system 20. Although two handles 32 are shown, embodiments having no handles, a single handle, or more than two handles are also within the scope of the disclosure. The housing 22 and/or the one or more handles 32 may be integrally or separately formed, such as from a molded plastic material for example.

Referring now to some of the interior features of the cooking system 20, an inner surface of the housing 22 defines a hollow interior 34. In an exemplary embodiment, a liner 36 that may be formed from any suitable conductive material, such as aluminum, is disposed within the hollow interior 34, and in some embodiments the liner 36 may be the inner surface defining the hollow interior 34 (though surfaces inside the liner 36, such as the walls of the container, or outside the liner 36, such as plastic around the liner 23, may also define the hollow interior 34). In an exemplary embodiment, a food container 38 is receivable inside the hollow interior 34 defined by the liner 36. Spacing components, such as silicone bumpers (not shown) may be disposed along the inner surface of the liner 36 to keep the container 38 aligned properly within the hollow interior 34 during cooking. Although the container 38 is described herein as being removable from the housing 22, embodiments where the container 38 is integrally formed with the housing 22 are also contemplated herein. The container 38 has an interior 40 designed to receive and retain one or more consumable products, such as food products. Examples of food products suitable for use with the cooking system 20, include but are not limited to, meats, fish, poultry, bread, rice, grains, pasta, vegetables, fruits, and dairy products, among others. The container 38 may be a pot formed from a ceramic, metal, or die cast aluminum material. In one embodiment, an interior surface 42 of the container 38 includes a nano-ceramic coating and an exterior surface 44 of the container 38 includes a silicone epoxy material. However, any suitable material capable of withstanding the high temperatures and pressures required for cooking food products is contemplated herein.

Referring with more detail to the lid 24, it should be noted that the lid 24 is connectable to a surface of the container 38 and/or housing 22 to close off entry to the interior 40 of the container 38. Accordingly, a cooking chamber may be defined between the interior 40 of the container 38 and the interior of the lid 24, or alternatively, between the hollow interior 34 defined by the liner 36 and the interior of the lid 24. In an exemplary embodiment, a diameter of the lid 24 can be complementary to a diameter of the housing 22 such that the lid 24 covers not only the container 38, but also an upper surface 46 of the housing 22. The lid 24 can be made of any suitable material, such as glass, aluminum, plastic, or stainless steel. Further, the lid 24 may, but need not, include one or more handles 48 for removably coupling the lid 24 to the remainder of the cooking system 20. In the illustrated embodiment, the lid 24 is coupled to the housing 22 via a hinge 50 such that the lid 24 is rotatable about an axis X between an open position and a closed position (FIG. 1). In such embodiments, the hinge axis X may be located at a side surface of the cooking system 20, or alternatively, at a back surface of the cooking system 20, such as vertically disposed relative to one or more handles 32 of the housing 22. However, embodiments where the lid 24 is separable from the housing 22, or movable between the open and closed positions in another manner are also contemplated herein. One or more fastening mechanisms (not shown) may, but need not, be used to secure the lid 24 to the housing 22 when the lid 24 is in the closed position. Any suitable type of fastening mechanism capable of withstanding the heat associated with the cooking system 20 is considered within the scope of the disclosure.

The cooking system 20 includes at least one heating element 52 for heating the cooking chamber defined between the interior 40 of the container 38 and the lid 24, or alternatively, between the hollow interior of the liner 36 and the lid 24. The at least one heating element 52 is positioned generally at or above an upper extent 54 of the container 38, proximate an upper opening of the container 38. In the illustrated embodiment, the at least one heating element 52 is disposed in the lid 24, and therefore is completely outside of the container 38 when the lid 24 is in the closed position. However, embodiments where the lid 24 is contoured such that the at least one heating element 52 is positioned at least partially within the container 38 are also within the scope of the disclosure.

Further, the cooking system 20 may, but need not, include other heating elements 52 positioned within the housing 22. For example, one or more heating elements, illustrated schematically in broken lines, may be located generally adjacent the bottom 28 of the housing 22 and/or adjacent a sidewall of the housing 22. However, embodiments where the cooking system 20 includes only one heating element 52 arranged above and generally adjacent or above the upper extent 54 of the container 38 are also within the disclosure.

In the illustrated embodiment, an air movement device 56, such as a fan, is selectively operable to circulate a flow of liquid, for example air, through the cooking chamber. In the illustrated embodiment, the air movement device 56 is driven by a motor 58 having a separate cooling mechanism 59 coupled thereto. The air movement device 56 is operable to circulate air within the cooking chamber through the at least one heating element 52. As the air passes over the at least one heating element 52, the air is heated for cooking the food within the cooking chamber. In an exemplary embodiment, the air movement device can be mounted within the lid 24 at a position vertically offset from the at least one heating element 52. However, other configurations of the air movement device 56 relative to the at least one heating element 52, for example a concentric arrangement of the air movement device 56 and the at least one heating element 52, are also contemplated herein.

Figure 2:
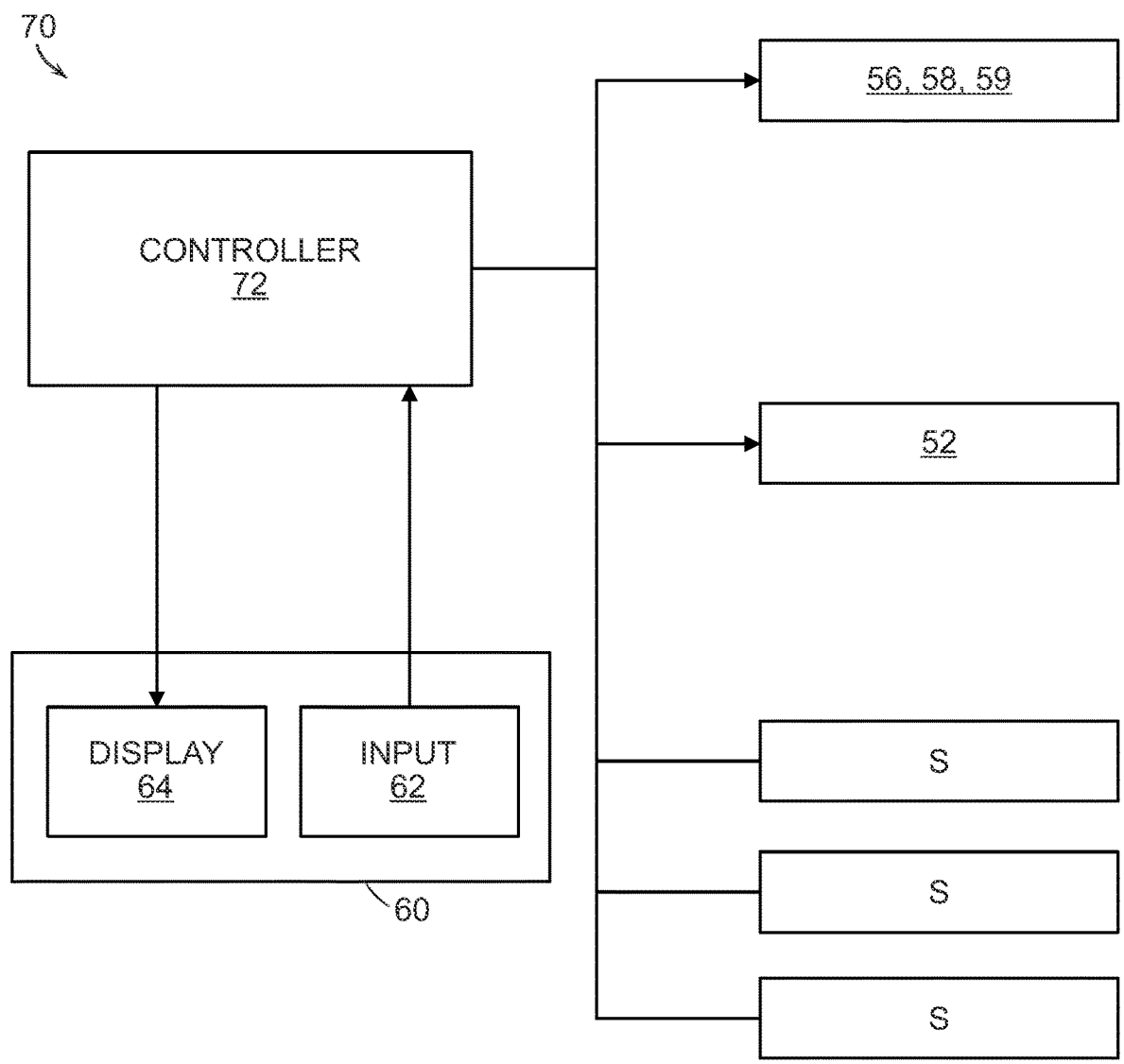
FIG. 2 is a schematic diagram of a control system of the cooking system of FIG. 1.
Figure 3:
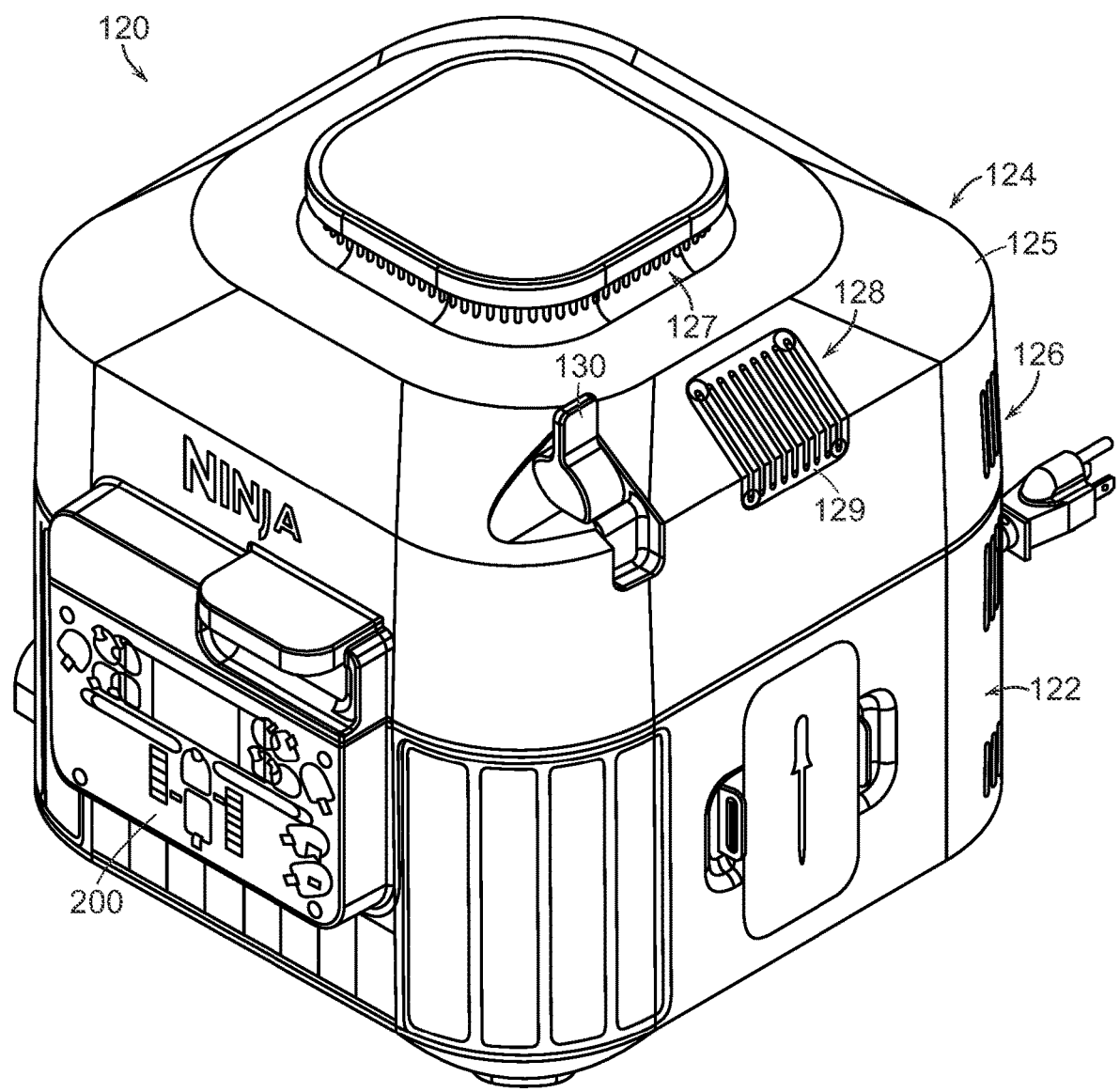
FIG. 3 is a perspective view of one embodiment of a cooking system according to one embodiment.

As best shown in FIG. 2, a control panel or user interface 60 of the cooking system 20 is positioned adjacent one or more sides of the housing 22. The control panel 60 includes one or more inputs 62 associated with energizing the at least one heating element 52 of the cooking system 20 and for selecting various modes of operation of the cooking system 20. One or more of the inputs 62 may include a light or other indicator to show that the respective input has been selected. The control panel 60 can additionally include a display 64 separate from and associated with the at least one input 62. However, embodiments where the display 64 is integrated into the at least one input 62 are also contemplated herein.

Operation of the one or more inputs 62 will be described in more detail below. A control system 70 of the cooking system 20 includes a controller or processor 72 for controlling operation of the at least one heating element 52 and operation of an air movement device 56 (including the motor 58 and fan 59 associated therewith). In some embodiments the control system 70 is additionally capable of executing stored sequences of heating operation. The processor 72 is operably coupled to the control panel 60, the at least one heating element 52, and the air movement device 56.

In addition, in one embodiment, one or more sensors S for monitoring one or more parameters (such as temperature, pressure, lid configuration, etc.) associated with operation of the at least one heating element 52 may be arranged in communication with the processor 72. In one embodiment, a sensor S can be used to monitor whether the lid 24 is in a closed configuration. Alternatively, or in addition, a sensor S can be used to monitor a temperature within the chamber defined between the interior 40 of the container 38 and the lid 24.

In one embodiment, at least one input 62 on the control panel 60 is an on/off button which allows the user to activate or deactivate the control panel 60. When the control panel 60 is deactivated, the at least one heating element 52 is not energized. In an exemplary embodiment, the at least one input 62 is operable to select one or more manual modes of operation of the at least one heating element 52. Alternatively, or in addition, at least one input 62 is operable to select a stored sequence of operation of at least one heating element. In some cases, the stored sequences may be particularly well suited for a given method of food preparation and/or for particular ingredients or types of ingredients. The plurality of stored sequences associated with the at least one input 62 may be stored within a memory accessible by the processor 72. Alternatively, the plurality of stored sequences may be stored remotely from the cooking system 20, and may be accessed by the processor 72, such as via wireless communication for example.

In addition, a user may be able to enter a time associated with operation of the cooking system 20 in a desired manual mode. The time may be entered via the same input 62, or a separate input as used to select a mode of operation. Further in embodiments where the cooking system 20 is in a mode configured to perform a stored sequence in response to selection of one of the inputs 62, the display 64 may indicate a time remaining on the display 64. Temperature and pressure parameters may also be entered via inputs 62.

The at least one input 62 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input 62 has been selected and any necessary information has been provided to the control panel 60. Alternatively, one or more of the other inputs 62, such as the knob for example, may be operable, such as by pushing the knob towards the control panel 60, to start and stop operation of the cooking system 20, regardless of whether the cooking system 20 is following a stored sequence or is in a manual mode.

The one or more inputs 62 are operable to initiate manual operation of the cooking system 20 in at least a first cooking mode and a second cooking mode. Both the first cooking mode and the second cooking mode use the at least one heating element 52 to perform a convective cooking operation. In one embodiment, the first cooking mode is a wet cooking operation, such as a steam cooking operation for example. To create a wet cooking environment the majority of the moisture within the container, i.e., fluid added to the container 38, is retained within the container 38 as the food is cooked.

During operation in the first cooking mode, a fluid, such as water, is provided to the cooking chamber and is transformed from a liquid state to a gaseous or vapor state via the heat output by the at least one heating element 52. In one embodiment, a fluid source, illustrated schematically at 80, is arranged in fluid communication with the cooking system 20. The fluid source 80 may include a reservoir mounted at an exterior of the cooking system 20 capable of storing a volume of fluid therein. The reservoir may be mounted directly to an exterior surface of the cooking system 20, or may be located remotely therefrom. Alternatively, the cooking system 20 may be directly connected to a fluid source 80, such as a water line. In yet another embodiment, the fluid source may be located within the interior of the cooking system 20, remote from the cooking chamber.

A fluid conduit 82 extends from the fluid source 80 through the cooking system 20, towards the cooking chamber and/or the at least one heating element 52. Depending on the position of the fluid source 80, the fluid conduit 82 may extend through either the lid 24 and/or the housing 22. In some embodiments, such as where the fluid source is disposed vertically above the at least one heating element 52, fluid is configured to flow through the fluid conduit 82 toward the cooking chamber and at least one heating element 52 via gravity. In other embodiments, the cooking system 20 may include a pump 84 for moving fluid from the fluid source through the fluid conduit 82. In embodiments including a pump 84, the pump 84 may similarly be controlled by the processor 72. Regardless of the configuration of the fluid source 80 and how fluid is propelled through the fluid conduit 82, the fluid exits the fluid source 80 as a liquid, and in some embodiments, the fluid is provided to the interior of the cooking system 20 as a liquid.

The fluid from the fluid source 80 is configured to vaporize when heat from the at least one heating element 52 is transferred thereto. In one embodiment, the end of the fluid conduit arranged adjacent the cooking chamber and the at least one heating element 52 is configured to atomize the fluid provided thereto. As a result, the fluid is expelled in the form of droplets or a spray rather than a stream of fluid. The fluid is delivered to an area adjacent at least one of the heating element 52 and/or the air movement device 56.

Accordingly, during a steam cooking operation, the processor 72 initiates operation of the at least one convective heating element 52 causing the temperature within the container 38 to increase. Similarly, the processor may initiate a flow from the fluid source 80 to through the fluid conduit 82, such as via pump 84, or by opening a valve associated with the fluid conduit 82. If the fluid from the fluid source 80 directly contacts the at least one heating element 52, the heat is almost instantaneously transferred to the fluid causing it to vaporize. In embodiments, where the fluid is expelled near the air movement device 56, the fluid may become entrained within the air circulating through the cooking chamber. As a result, when the air and fluid is heated as it passes over the at least one heating element 52, causing the fluid becomes a gas, such as water vapor or steam. This transformation of a liquid to a vapor performed within the cooking chamber in response to the heat generated by the at least one heating element 52 causes not only the pressure, but also the humidity within the cooking chamber, to increase.

Although an air movement device 56 is illustrated and described with respect to the heating element 52 and operation of the cooking system 20 in the first cooking mode, embodiments where the air movement device 56 is non-operational in the first cooking mode are also contemplated herein. Accordingly, in such embodiments, the heating element mounted within the lid 24 may be a conductive, inductive, or radiative heating element in place of the previously described convective heating element. In such embodiments, the interaction of the fluid from the fluid source with the heating element 52, or alternatively, the area adjacent the heating element, may cause the fluid to transform from a liquid to a vapor.

As previously suggested, the at least one input 62 may also be used to select operation of the cooking system 20 in a second cooking mode. During operation in the second cooking mode, the at least one heating element performs a "dry cooking operation," which includes any cooking mode that creates a "dry cooking environment" within the container 38. To create a dry cooking environment, air and/or moisture are actively exhausted or vented from the cooking chamber to outside the cooking system 20, thereby maintaining a minimum level of moisture within the container 38. In one embodiment, the second cooking mode includes a frying cooking operation, and more specifically an air frying operation. An air frying operation may involve the use of various components such as the air movement mechanism 56, a diffuser 90, and an insert 92.

An example of an air diffuser 90 suitable for use with the cooking system 20 is shown in FIG. 1. The diffuser 90 is an optional system component that may benefit air circulation during the air-frying mode. However, it should be understood that the diffuser 90 may similarly be installed within the cooking chamber during operation in the first cooking mode. The diffuser 90 is positionable anywhere within the cooking chamber, though typically near a bottom thereof. In one embodiment, the diffuser 90 is positioned in contact with a bottom surface 39 of the container 38, and can be used in conjunction with an insert 92.

The air diffuser 90 may include a plurality of vanes 94 configured to impart swirl to an air flow circulating through the container 38. In an exemplary embodiment, each of the vanes 94 of the air diffuser 90 has a radius of curvature such that the vanes 94 curve generally from a center of the air diffuser 90 outwardly. In addition, the vanes 94 of the air diffuser 90 extend generally perpendicularly in an upward direction from the bottom surface 39 of the container 38, and a lower extent of the vanes 94 generally increases over the length of the vane. However, an air diffuser 90 including one or more vanes 94 having another configuration are also within the scope of the disclosure.

In one embodiment, the vanes 94 cooperate to define an area within which the insert 92 may be removably mounted. The insert 92 includes a body having a first, open end 96, a second, aperture end 98, and at least one sidewall 100 extending between the first end 96 and second end 98 to define a hollow interior or chamber 102. The first end 96 is generally open to provide access for positioning one or more food items within the chamber 102. The second end 98 of the insert is partially closed to retain one or more food items within the chamber 102. In the illustrated embodiment, the closed second end 98 of the body defines a plurality of apertures to allow air, heat, and/or steam flowing within/through the interior 40 of the container 38 to pass there through to cook one or more food items within the chamber 102.

When the insert 92 is mounted to the air diffuser 90, and positioned within the interior 40 of the container 38, the bottom surface 98 of the insert 92 is offset from the bottom surface 39 of the container 38. The offset spacing occurs due to the vanes 94, thereby allowing air moving through the cooking system 20 to flow underneath the insert 92. Embodiments wherein the diffuser 90 is integrally formed with either the insert 92 or bottom surface 39 and/or side surfaces of the container 38 are also contemplated. Further, although insert 92 is illustrated having a single chamber 102, embodiments where the insert 92 includes a plurality of chambers 102 are also contemplated herein.

When the insert 92 and air diffuser 90 are arranged within the cooking chamber, an annulus 104 is formed between an inner surface 106 of the container 38 and the sidewalls 100 of the insert 92. Further, in an exemplary embodiment the height of the insert 92, when installed within the container 38 with the air diffuser 90, may be generally equal to or less than height of the container 38.

It should be appreciated that the insert 92 may also be received directly in the hollow interior 34 of the housing 22 as opposed to within the interior 40 of the container 38. That is, the insert 92 (and diffuser 90) may be disposed in the cooking system 20 without the container 38, and food may be cooked in the insert 92 in accordance with the second mode cooking functions.

During operation in the second cooking mode, the at least one heating element 52 is configured to heat air as it passes there through via operation of the air movement device 56. In embodiments where the insert 92 is arranged within the cooking chamber, the air movement device 56 draws air from the center of the insert 92, and moves it across the at least one heating element 52 before forcing the heated air through the annulus 104 between the container 38 and the insert 92 towards a clearance 108 formed between the bottom 98 of the insert 92 and the bottom surface 39 of the container 38 (see arrows in FIG. 1 indicating the direction of air flow through the cooking system 20 during a second cooking operation). Although use of the diffuser 90 and insert 92 are described herein, it should be understood that the at least one heating element 52 and air movement device 56 may also be used to circulate air through the cooking chamber defined between the container 38 and the lid 24 when the insert 92 and/or air diffuser 90 are not arranged within the container 38.

In one embodiment, the at least one heating element 52 has a diameter substantially equal to the diameter of the body of the insert 92. However, embodiments where the at least one heating element 52 has a diameter smaller than or greater than the diameter of the insert 92 are also contemplated herein.

When utilizing the at least one heating element 52 in the air fryer mode, the processor 72 initiates operation of the at least one heating element 52 and the air movement device 56 to circulate the hot air represented by the arrows in FIG. 1 through the cooking chamber. The air movement device 56 draws air upward through the at least one heating element 52 and expels the hot air outwardly towards a guide 110 (which, in an embodiment, actually surrounds the air movement device 56). The guide 110 may be configured to deflect the air flow downwardly towards the annulus 104 along the sides of the container 38. The air travels down through the annulus 104 by actuation of the air movement device 56 until it is deflected off the bottom surface 39 of the container 38 and drawn up into the clearance 108 up towards the diffuser 90 and end 98 of the insert 92. The hot air flows over and between the plurality of vanes 94 of the air diffuser 90, which impart a rotational motion to the hot air, thereby creating a vortex as the air is drawn through the apertures at the second end 98 and into the chamber 102 of the insert 92 by the air movement device 56. After traversing the chamber 102, the air is drawn back up through the heating element 52 and into the air movement device 56 for further circulation.

As the air circulates through the chamber 102 in the manner described above, the hot air cooks and forms a crispy outer layer on the food items disposed therein as a result of the Maillard effect. In one embodiment, a liquid, such as oil or fat, is contained within the cooking chamber, such as adjacent the bottom surface 39 of the container 38. The liquid may be added to the container 38 prior to operation in the air fry mode, or alternatively, may be produced as a residual material as the hot air passes over the food within the chamber 102. In embodiments where a liquid is disposed at the bottom of the container 38, as the air circulates through the interior 40 of the container 38, a portion of the liquid becomes entrained in the air flow and is heated.

In one embodiment, the air movement device 56 of the cooking system 20 is a variable speed fan operable at a plurality of rotational speeds. The operational speed of the air movement device 56 may vary based on the cooking mode selected. For example, the speed of the air movement device 56 during operation in an air fryer mode may be different than the speed of the air movement device during operation in a steam cooking mode. The operational speed of the air movement device 56 may be controlled by the processor 72 in response to one or more inputs 62, including selection of a cooking mode. However, the processor 72 may also be configured to adjust the operational speed of the air movement device 56, or alternatively, the power supplied to the at least one heating element 52 to control the temperature and/or pressure within the cooking chamber.

In some embodiments, the cooking system 20 is operable in more than two cooking modes. For example, the at least one input 62 may be used to select operation of the cooking system 20 in a cooking mode that functions as a combination of two or more cooking modes. In such embodiments, the processor 72 may execute a stored sequence where the at least one heating element 52 is operated with a first set of parameters during a first portion of the sequence and at least one heating element 52 is operated and air movement device 56 are operated with a second set of parameters during a second portion of the sequence. For example, in the combination mode, a food item, such as a chicken for example, may first be steam cooked via operation in the first cooking mode, and then air fried to form a crispy exterior layer via operation of the cooking system 20 in the second cooking mode. However, the embodiments described herein are intended as an example only and any sequence of operation combining both the first and second cooking mode is contemplated herein. When operated in a combination of two or more cooking modes, the food need not be removed from the cooking chamber or hollow interior 40, during such a transition.

In accordance with the above, the insert 92 may be placed in the container 38 with food to be cooked in the first and second modes consecutively. For example, the insert 92 may be placed in the container 38 and food may be placed within the insert 92 for cooking in a first steam cooking mode. The cooking system 20 may then be switched into the second, air fry mode, and the food still contained in the insert 92 positioned within the container 38 can be cooked in accordance with a convection heating function. Such a process would involve placing food in the insert 92 and placing the insert 92 in the interior 40 of the container 38. Of course, while food would most commonly be cooked first wet mode followed by a second dry mode, the cooking system 20 is certainly capable of cooking food first in a dry mode followed by a wet mode.

The cooking system 20 illustrated and described herein provides an enhanced user experience by combining the functionality of several conventional household products into a single user-friendly device. However, in order to achieve both a steam cooking operation and an air frying operation within the same unit without removing the lid, the high humidity air must be removed from the system and replaced with less humid air. By using a single vent, the inlet and outlet must be spaced apart to prevent the inlet taking in high humidity air from the outlet.

FIGS. 3-11 illustrate an exemplary embodiment of a cooking system 120, which is configured to use a single vent to reduce complexity, while also separating the inlet and outlet streams of air. The cooking system 120 is substantially similar to the cooking system 20 described above, and identical parts will not be discussed for brevity.

The cooking system 120 generally includes a base 122 and a lid 124 permanently or removably attached, such as hinged, to the base 122. The connection or hinge area between the base 122 and the lid 124 can occur at an upper portion of the base 122. Arranged on the base 122 is a control panel 60, which is configured to operate the air movement device 152 and heating elements 150 of the cooking system 120, and can have the same configuration as the control system of FIG. 2. The base 122 is configured to house a food chamber (not shown) which contains the food for cooking. Additionally, in some embodiments, the base 122 may house a heating element (not shown) arranged at the bottom of the base 122, similar to the cooking system 20.

In order to seal the cooking system 120, the lid 124 is arranged over the base 122 and sealed to the base 122. This connection between the base 122 and the lid 124 creates a sealed, hollow cooking chamber within the cooking system 120. The lid 124 generally includes an outer casing 125, an first intake vent 126, a second intake vent 127, a venting assembly 128, a venting grate 129, and a switching mechanism 130. The intake vents 126, 127 are formed within the outer casing 125 of the lid 124 and are fluidly coupled to the interior cooking chamber of the cooking system 120. As will be explained in detail below, the intake vents 126, 127 are spaced a distance from the venting grate 129, which acts as an outlet for air and moisture from the cooking system 120. The venting grate 129 is arranged in an opening of the outer casing 125, but can be integral with the outer casing 125, similar to the first intake vent 126. In addition to the outer casing 125, the lid 124 also includes an inner casing 125a, which includes intake vent 126a, which aligns with the intake vent 126 arranged in the outer casing 125, and intake vent 127a, which aligns with the intake vent 127 arranged in the outer casing 125.

Figure 4:
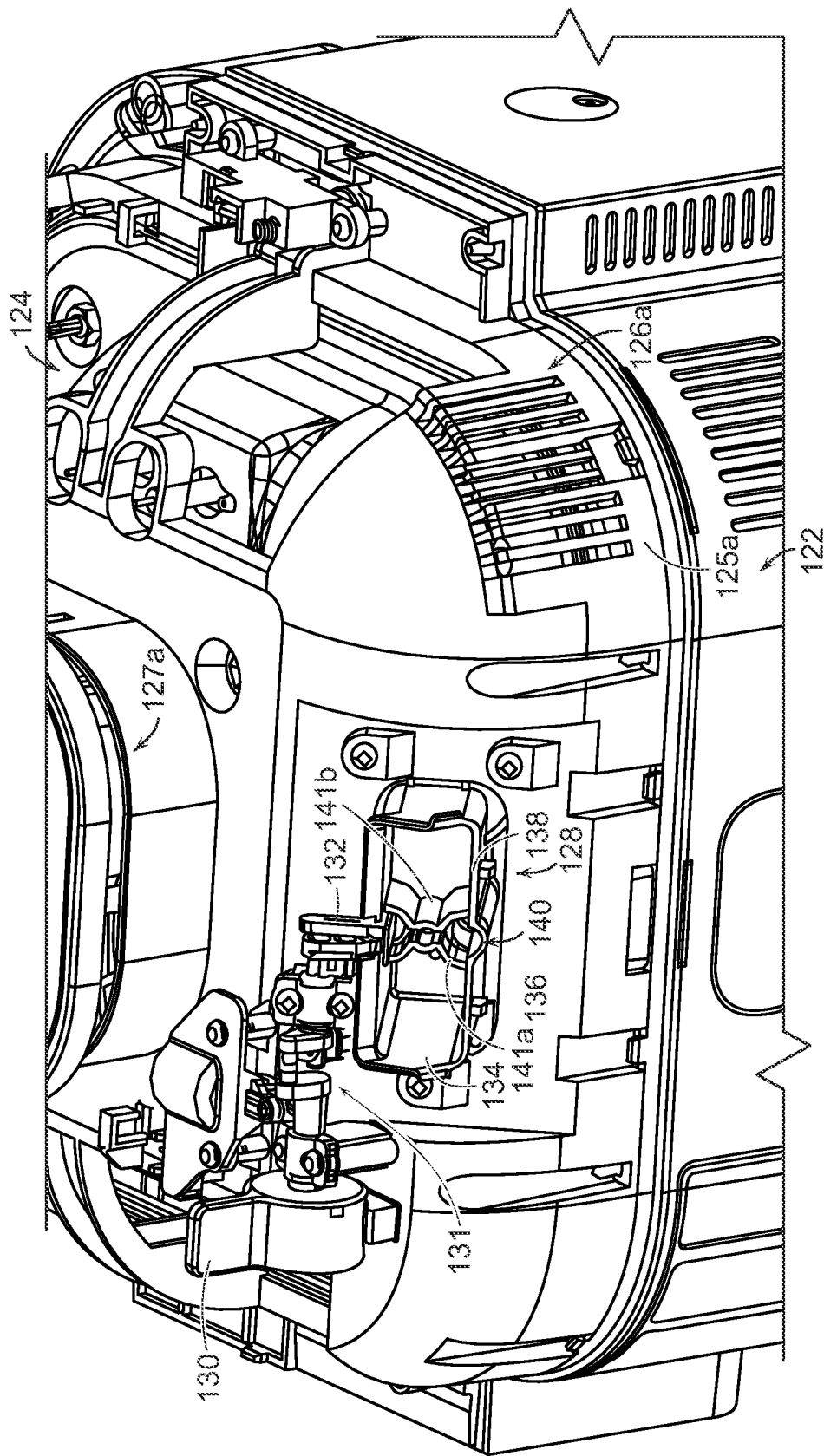
FIG. 4 is an enlarged perspective view of a portion of cooking system of FIG. 3 with an outer casing of a lid removed.
Figure 5:
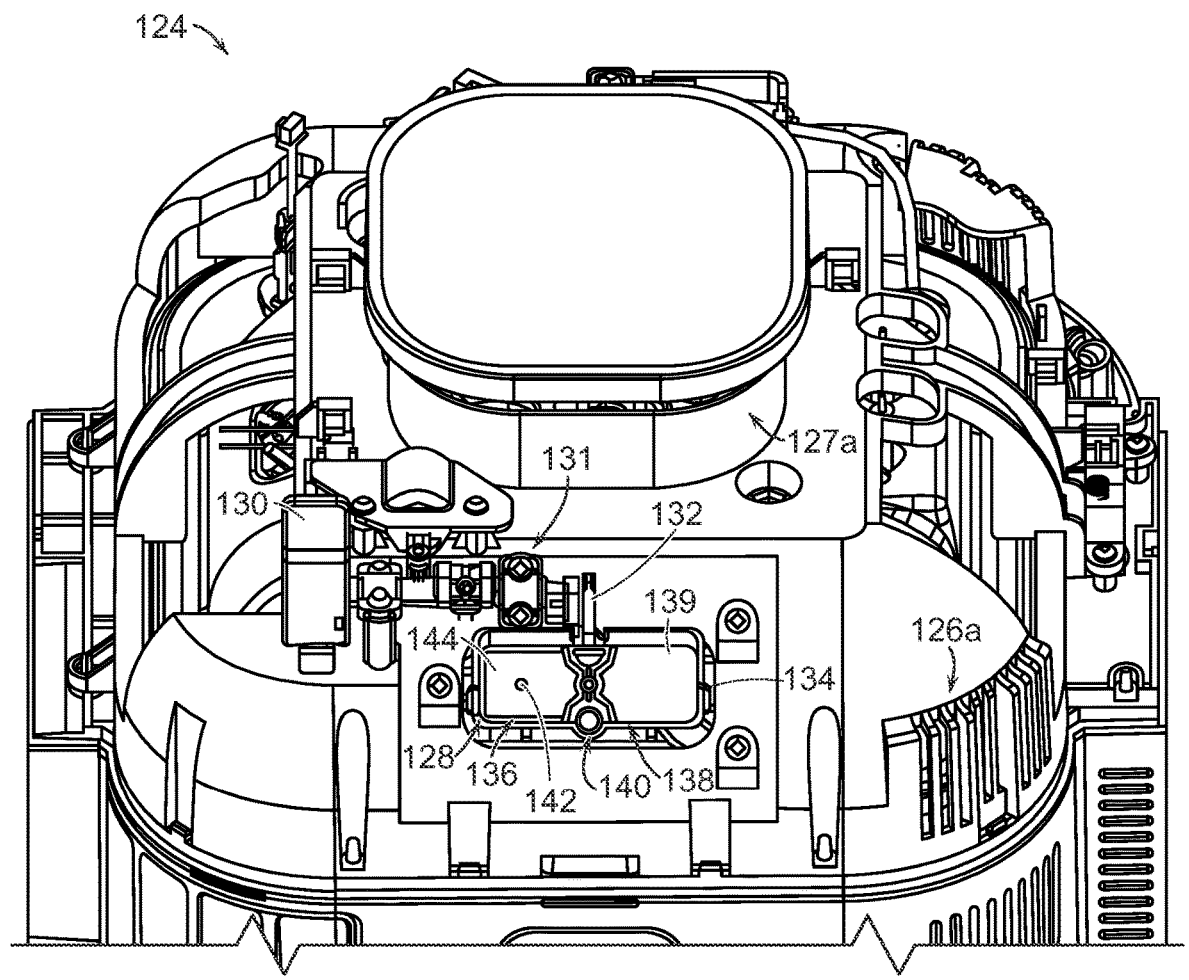
FIG. 5 is a perspective view of the lid of FIG. 4.
Figure 6:
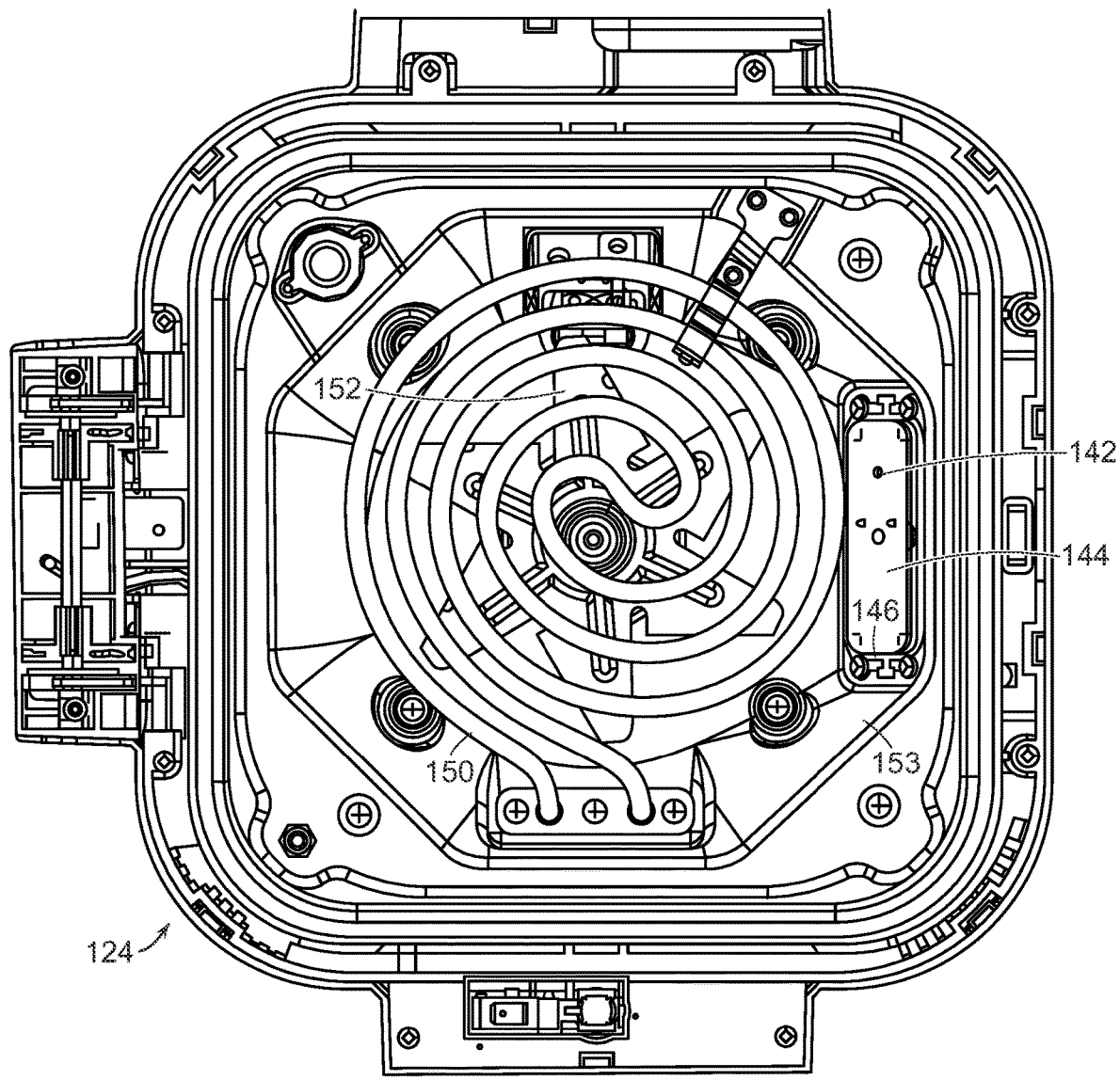
FIG. 6 is a bottom view of the lid of FIG. 5.
Figure 7:
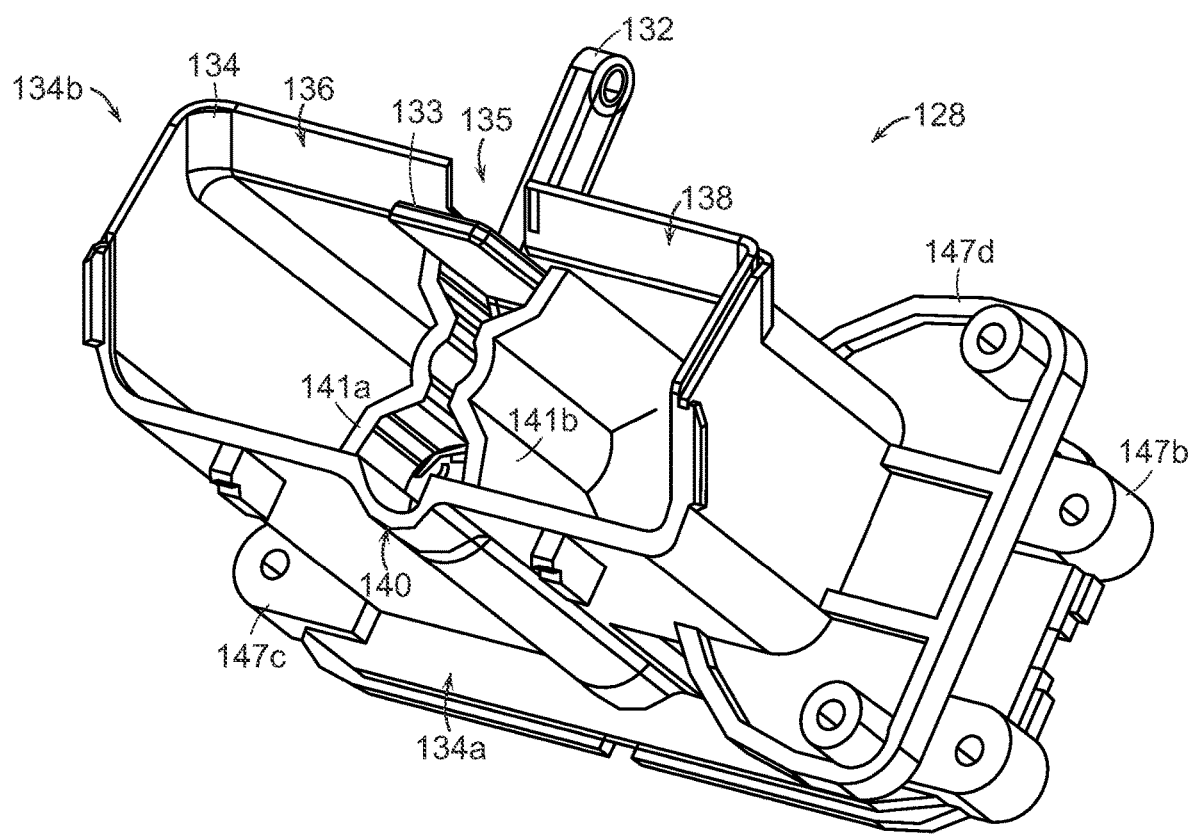
FIG. 7 is an isolated perspective view of a venting assembly of the cooking system of FIG. 3.
Figure 8:
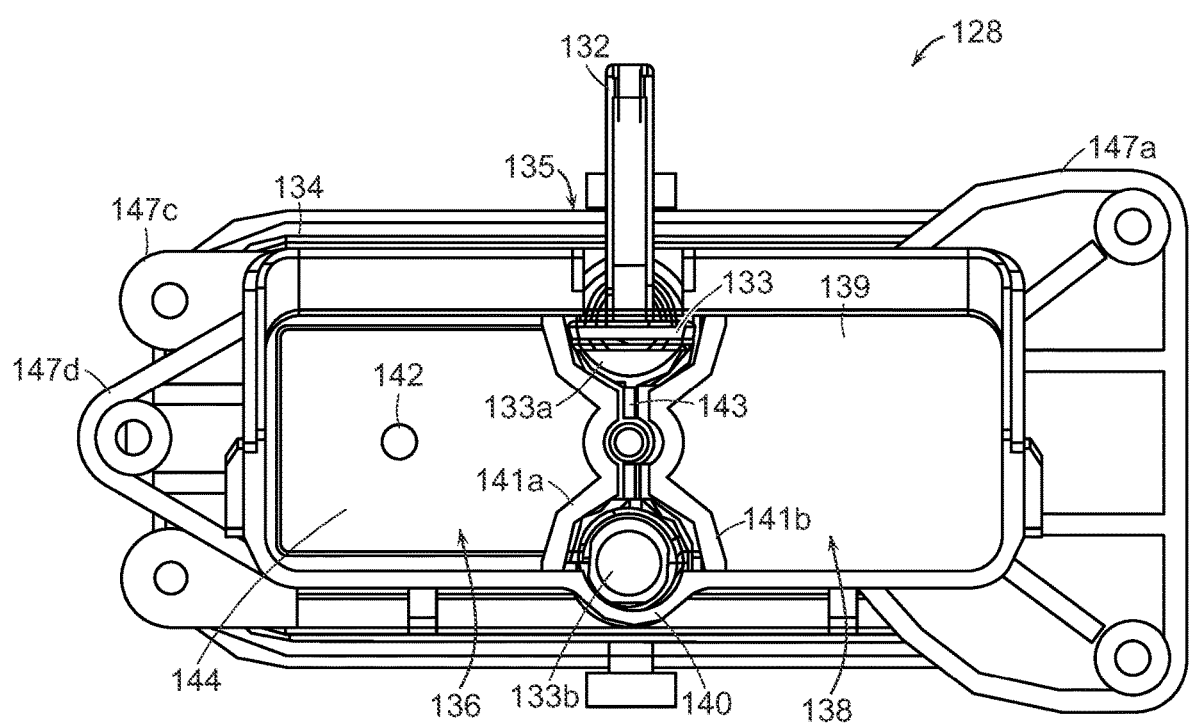
FIG. 8 is an isolated top view of the venting assembly of FIG. 7.

Due to the multiple cooking operations of the cooking system 120, the switching mechanism 130 is arranged on with lid 124 and is accessible for a user to operate the actuation switch in order to opening the venting assembly 128 to remove high humidity air within the cooking system 120 and bring less humid air in through the intake vents 126, 127. FIG. 4 has the outer casing 125 of the lid 124 removed in order to show the internal components of the lid 124. The switching mechanism 130 is mechanically coupled to the vent assembly 128 through a linkage 131. In an aspect, the switching mechanism 130 is a switch body including a tab, where the switch body is rotatable about an axis and the tab is configured to allow a user to apply a torque to the switch body. However, any type of switching mechanism or mode selector can be used and should be considered within the scope of this disclosure. For example, the switching mechanism can be a dial, a lever, a button, a slider, or the like.

The linkage 131 is arranged underneath the outer casing 125 and is configured to translate a rotational force applied to the switching mechanism 130 into a linear force applied to components of the venting assembly 128, which will be disclosed in detail below. The linkage 131 spans a distance along the inner casing 125a to the venting assembly 128 and connects with a projection 132 of the venting assembly 128. The components of the linkage 131 operate in unison through actuation of the switching mechanism 130 by sliding the piston 133 within the vent tube 134. The linkage 131 engages with the piston 133 via a projection 132 (shown in FIG. 5) arranged within the slot 135 of the vent tube 134, allowing the piston 133 to slide forward and backward within the vent tube 134. The projection 132 engages with the linkage 131 in order to translate the motion of the switching mechanism 130 to the piston 133.

Figure 12:
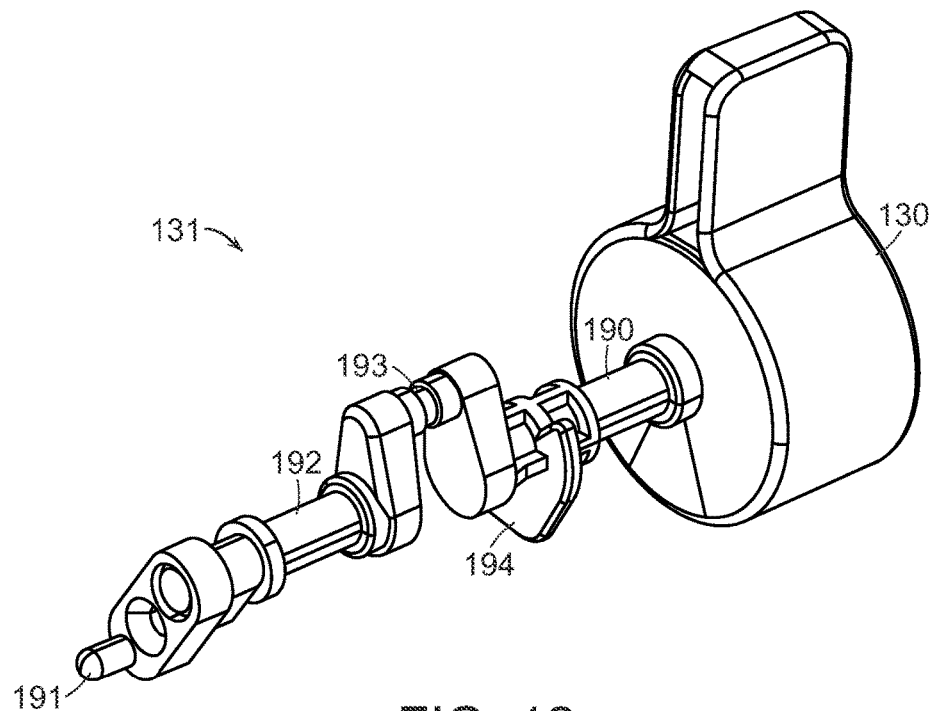
FIG. 12 is a perspective view of a linkage having a switch.

As illustrated in FIG. 12, the linkage 131 is formed from a first rod 190 connected to the switching mechanism 130 and a second rod 192 connected to the projection 132. The first and second rods 190, 192 are coaxially aligned with one another along an axis of rotation and are connected in the middle by a connector 193. The connector 193 includes two extending arms which extend radially outward from the axis of rotation of the first and second rods 190, 192. The connector 193 is generally an inverted "U" shape where the horizontal portion of the "U" is radially offset from the axis of rotation of the first and second rods 190, 192. Additionally, a spring 196 (shown in FIG. 13) attaches to the connector 193 at the radially offset point from the axis of rotation of the first and second rods 190, 192. Due to the offset spring connection, the spring 196 can to apply a torque to the first and second rods 190, 192 to keep the switching mechanism 130 biased to the first position. A cam 194 is arranged on the first rod 190 and is configured to contact a micro switch arranged adjacent to the cam 194 when the venting switch is rotated from the first position to the second position, as described in more detail below. The cam 194 is arranged between the switching mechanism 130 and the connector 193, and extends radially outward from the first rod 190. Additionally, the cam 194 is configured to extend towards the interior of the lid 124 where a micro switch is arranged. A projection 191 is arranged at the opposite end of the linkage 131 relative to the switching mechanism 130, and it is configured to engage with the slot of the projection 132 (shown in FIG. 5) of the piston 133.

For clarity, FIGS. 7-11 depict the venting assembly 128 in isolation. It should be appreciated that the venting assembly is arranged within the lid 124, and passes though apertures within the outer casing 125 and the inner casing 125a in order to fluidly couple the internal cooking compartment of the cooking system 120 with the ambient environment. The venting assembly 128 is configured to allow for the ingress of ambient fluid, such as air, into the internal volume of the cooking system 120, and the egress of steam and/or heated fluid from within the internal volume of the cooking system 120 during or at the completion of a cooking process. The use of a single venting assembly 128 simplifies the manufacture and use of the cooking system 120 since a user only needs to operate the venting assembly 128 by moving the switching mechanism 130 to change the venting assembly 128 from a non-venting to a venting position.

As shown, the venting assembly 128 generally includes a vent housing or tube 134, with the venting grate 129 arranged at the end of the vent tube 134. The illustrated vent tube 134 is in the form of a rectangular housing or tube that generally includes a multiple channels extending therethrough between a distal end 134a and a proximal end 134b. The vent tube 134 extends from the ambient environment to the internal volume in order to allow the ingress and egress of fluid between the ambient environment and the internal volume of the cooking system 120. In particular, the distal end 134a is in fluid communication with the cooking chamber, while the proximal end 134b extends externally outward from the lid 124 and is in communication with the ambient environment. The vent tube 134 is secured within the lid 124, and between the outer casing 125 and the inner casing 125a by mounts 147a, 147b, 147c, and 147d arranged on the outer surface of the vent tube 134. The mounts 147a, 147d secure the vent tube 134 to the inner casing 125a, and the mounts 147b, 147c secure the vent tube to an internal surface 153 of the lid 124.

The vent tube 134 includes distinct channels which are separated by internal walls 141a, 141b. An outlet channel 136 extends between a distal end 134a and a proximal end 134b, and is defined by the sidewall of the vent tube 134 and the inner wall 141a. An inlet channel 138 is arranged on the opposite side of the vent tube 134 and extends from the distal end 134a to an inlet opening 149 arranged within the sidewall of the vent tube 134. In an aspect, the inlet opening 149 is arranged non-adjacent to an outlet of the outlet channel 136, which guides high-moisture air away from the inlet opening 149. Additionally, in an aspect, the inlet opening is arranged perpendicular to the outlet channel 136 such that the air passing through the inlet channel 149 is perpendicular to the air flowing through the outlet channel 136. The inlet opening 149 is configured to allow air to be taken in from the ambient environment through the intake vent 126. In some embodiments, an inlet channel 138 exists between the outer casing 125 and the inner casing 125a such that intake air can flow from the intake vent 126 to the inlet opening 149. A divider 139 is arranged within the inlet channel 138 to prevent exhaust air flowing through the outlet channel 136 to be drawn back through the inlet channel 138. The inlet channel 138 is defined by the sidewall of the vent tube 134, the inner wall 141b, and the divider 139.

The vent tube 134 also includes a center channel 140 arranged between the outlet channel 136 and the inlet channel 138. The center channel 140 is defined by the sidewall of the vent tube 134 and the inner walls 141a, 141b. The center channel 140 extends between a distal end 134a and a proximal end 134b, and houses the piston 133. As stated above, the piston 133 is secured to the projection 132, which allows for a linear force to be imparted to the piston 133 to move the piston 133 within the center channel 140.

The vent tube 134 also includes a slot 135 in a sidewall thereof that slidably receives the projection 132 extending from a sidewall of a piston 133, discussed in more detail below. The slot 135 allows for movement of the piston 133 along the height of the vent tube 134 between the distal end 134a and the proximal end 134b.

The piston 133 includes an extension 143 extending within the center channel 140 from the projection 132 to a plate 144 arranged at the distal end 134a of the vent tube 134. The piston 133 also includes spring-biased extensions 133a, 133b arranged on either side of the extension 143. The spring-biased extensions 133a, 133b are configured to keep the piston 133 biased to a non-venting position. Springs or biasing members (not shown) are arranged within the central channel 140 to apply a biasing force to the spring-biased extensions 133a, 133b.

Figure 10:
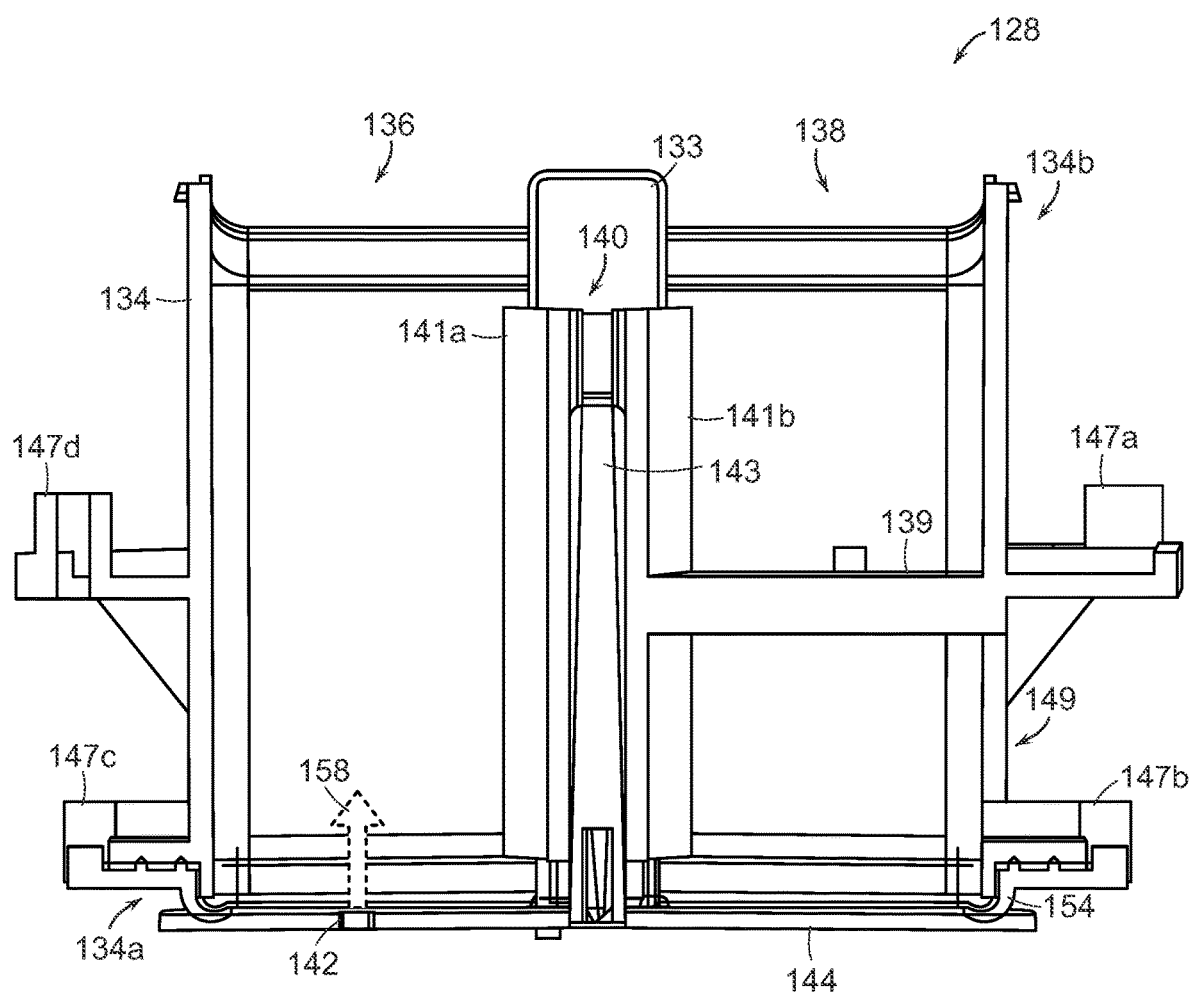
FIG. 10 is an isolated cross-sectional view of the venting assembly of FIG. 7, shown in a non-venting position.

The plate 144 is configured to seal the outlet channel 136 and the inlet channel 138 when the piston 133 is in a non-venting position, as illustrated in FIG. 10. A sealing member 154 is arranged around the outer perimeter of the distal end 134a of the vent tube 134. The plate 144 and sealing member 154 have a complementary rectangular shape to the distal end 134a, with the edges of the plate 144 extending to contact the sealing member 154, arranged on the internal wall of the lid 124, in order to provide a substantially airtight seal. Arranged within the plate 144 is a vent hole 142, which is in fluid communication with the outlet channel 136. The vent hole 142 remains open at all times as a fail-safe to prevent over-pressurizing the cooking system 120, and allows exhaust air 158 to pass through the vent hole 142 at all times.

Figure 9:
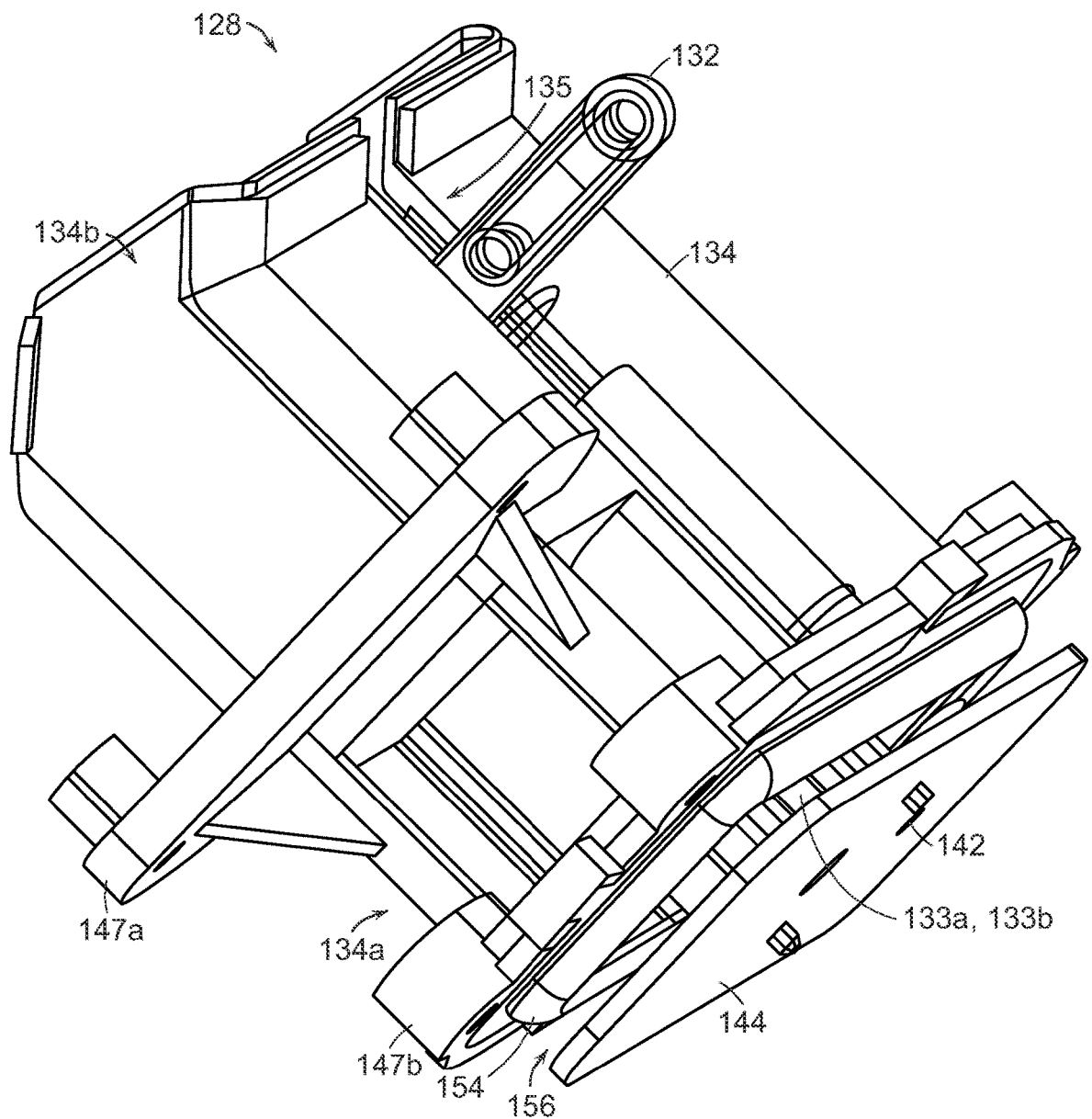
FIG. 9 is an isolated perspective view of the venting assembly of FIG. 7, shown in a venting position.
Figure 11:
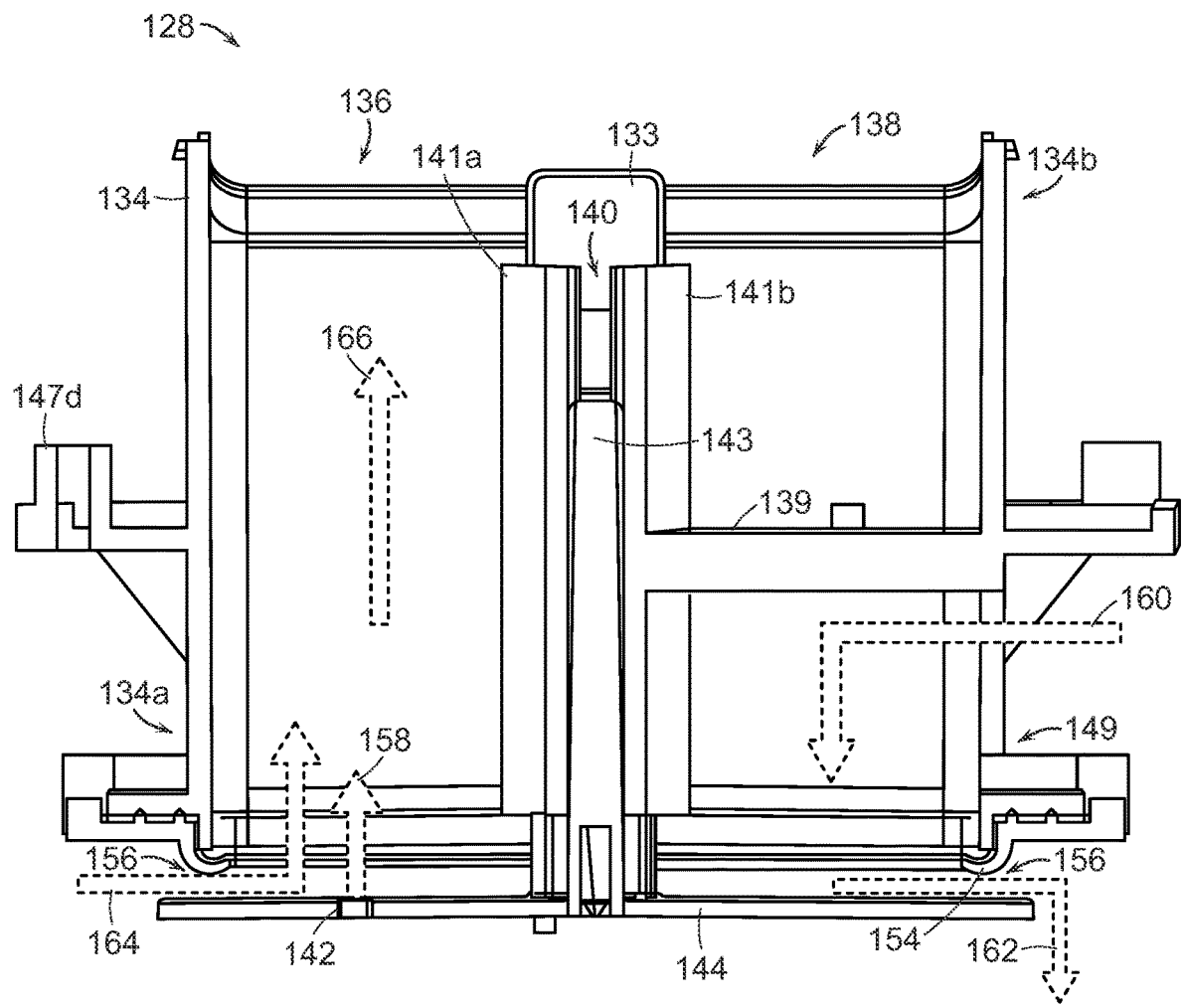
FIG. 11 is an isolated cross-sectional view of the venting assembly of FIG. 7, shown in a venting position.

FIG. 10 illustrates the piston 133 in a non-venting position, and FIG. 11 illustrates the piston 133 in a venting position. The piston 133 can be arranged in a non-venting position in order to keep steam and pressure within the internal volume of the housing during a wet cooking mode. However, as detailed above, it may be desired to transition from a wet cooking mode (e.g., steaming) to a dry cooking mode (e.g., air frying) without removing the contents from the cooking device. In order to vent the steam from within the housing, the piston 133 can be slid downward within the vent tube 134 (as shown in FIG. 9) in order to create a gap 156 between the plate 144 and the seal member 154 by dislodging the overlap between the plate 144 and the seal member 154. By creating the gap 156, air and steam from within the housing can be evacuated from the internal volume of the housing, and ambient air, that does not contain steam, can be brought into the internal volume. Due to the single vent tube design, an inlet channel 138 and an outlet channel 136 are formed on opposite sides of the gap 156. In an exemplary embodiment, with the piston 133 in a venting position, the air movement device 152 can rotate clockwise as arranged in FIG. 6, forcing air outward through the outlet channel 136, while pulling air in from the inlet channel 138.

FIG. 10 illustrates a detailed cross-sectional view of the piston 133 while in a non-venting position. With the piston 133 in a non-venting position, only exhaust air 158 is vented through the outlet channel 136. FIG. 11 illustrates a detailed cross-sectional view of the piston 133 while in a venting position. With the piston 133 in a venting position, ambient air 160 can be drawn through the inlet opening 149 from the intake vent 126 and into the internal volume. The intake air 162 passes through the gap 156 between the plate 144 and the sealing member 154. Additionally, the exhaust gas 164, containing steam and air, within the internal volume is passed through the gap 156 on the opposite side of the vent tube 134 and through the outlet channel 136. The exhaust gas 164 combines with the exhaust gas 158 passing through the vent hole 142 to create exhaust gas 166, which is a high-humidity air. As stated above, in order to prevent the exhausted gas 166 from re-entering the inlet opening 149, the divider 139 and inner walls 141a, 141b separates the intake channel 138 from the outlet channel 136. This enables the exhaust gas 166 to be exhausted to the ambient environment without being drawn back into the internal volume. Another solution to prevent redrawing of exhausted fluid can be to place the inlet ports and exhaust ports at further distances apart, but this can require a larger piston or multiple pistons to control the ingress and egress of fluid.

Figure 13:
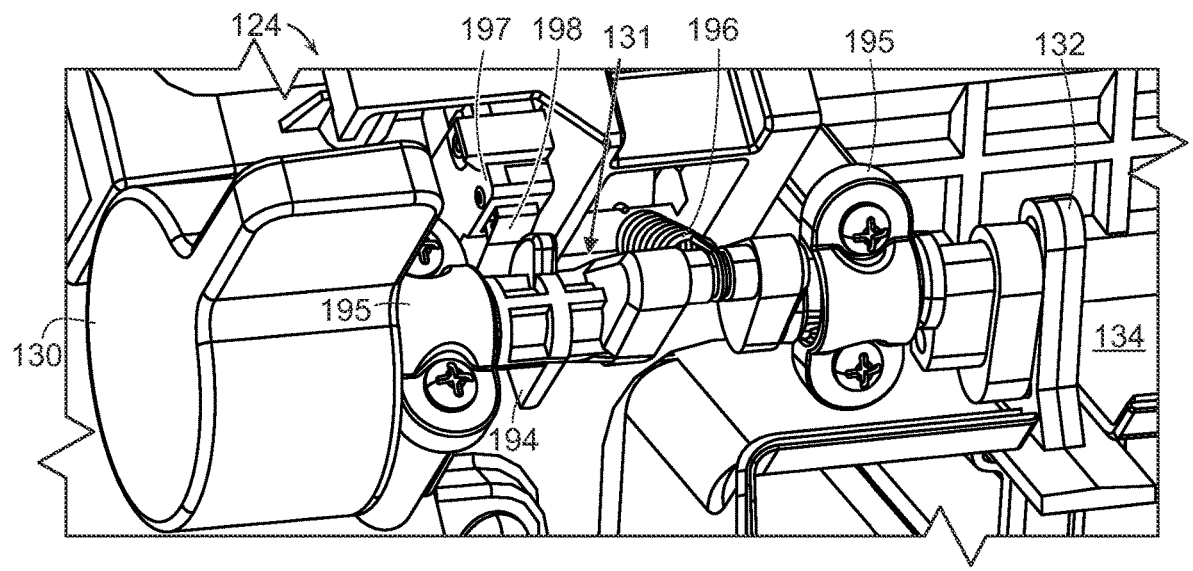
FIG. 13 is a perspective view of a lid of a cooking system with an outer cover removed depicting the linkage of FIG. 12.
Figure 14A:
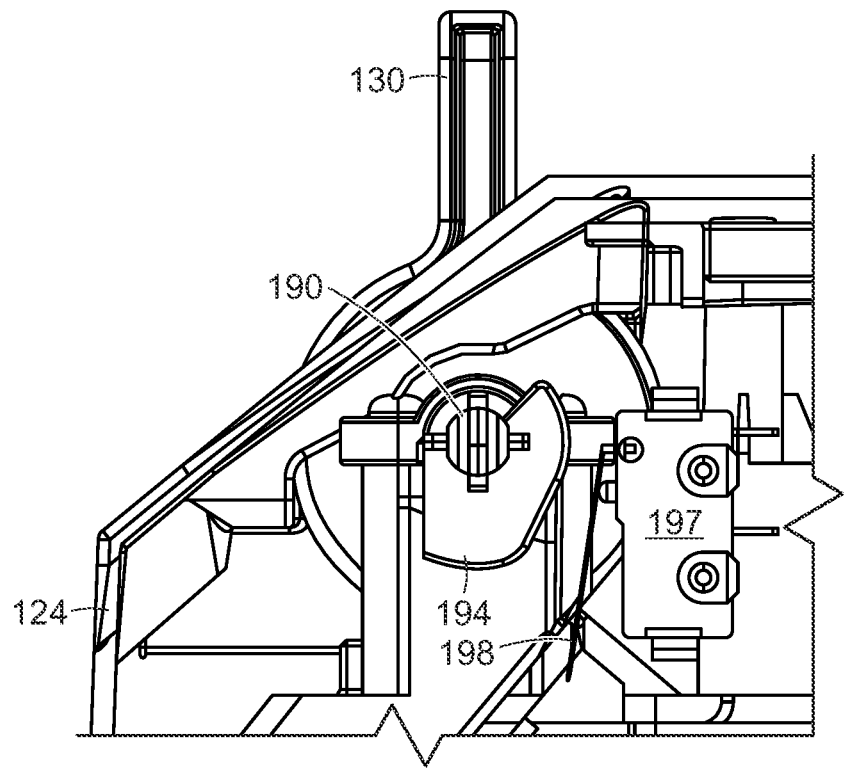
FIG. 14A is a cross-sectional view of the lid of FIG. 13 with the switch in a first position.
Figure 14B:
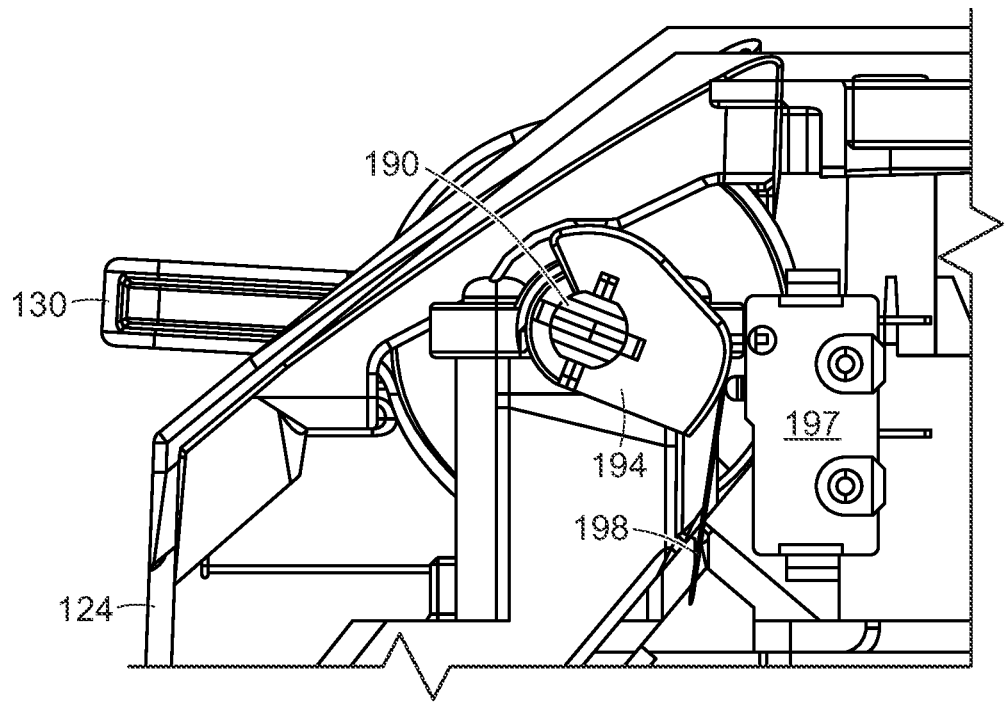
FIG. 14B is a cross-sectional view of the lid of FIG. 13 with the switch in a second position.

In addition to moving the piston 133, the switching mechanism 130 can also be configured to rotate the linkage 131 to contact sensors while alternating from the first position to the second positon. As illustrated in FIGS. 13-14B, the linkage 131 is secured within the lid 124 using clamps 195, which allow for rotation of the linkage 131 relative to the lid 124. As stated above, the spring 196 is secured between the connector 193 and the lid 124 so the switching mechanism 130 is spring-biased to the first position. Additionally, a micro switch 197 is arranged within the lid 124 between the switching mechanism 130 and the vent tube 134. The micro switch 197 includes a bump plate 198 that extends towards the linkage 131. With the switching mechanism 130 in a first position, the cam 194 does not contact and/or depress the bump plate 198 of the micro switch 197 as illustrated in FIG. 14A. When the switching mechanism 130 is moved to the second position, as illustrated in FIG. 14B, the bump plate 198 is aligned with the cam 194 such that the cam 194 contacts the bump plate 198. By contacting the bump plate 198, a signal can be sent from the micro switch 197 to the processor 72 to indicate that the piston is in a venting mode. When no signal is received by the processor 72, the processor 72 can determine that the piston 133 is in a non-venting mode.

As previously described, the cooking system 120 is capable of performing a plurality of cooking operations including a wet cooking mode (e.g., steaming) and a dry cooking mode (e.g., air frying). To perform a cooking operation that includes a combination of multiple types of cooking modes, the food item need not be removed from the interior 40 of the container 38 as the cooking system 120 transforms between a first mode, such as a steaming mode for example, and a second mode, such as an air frying mode for example.

Figure 15:
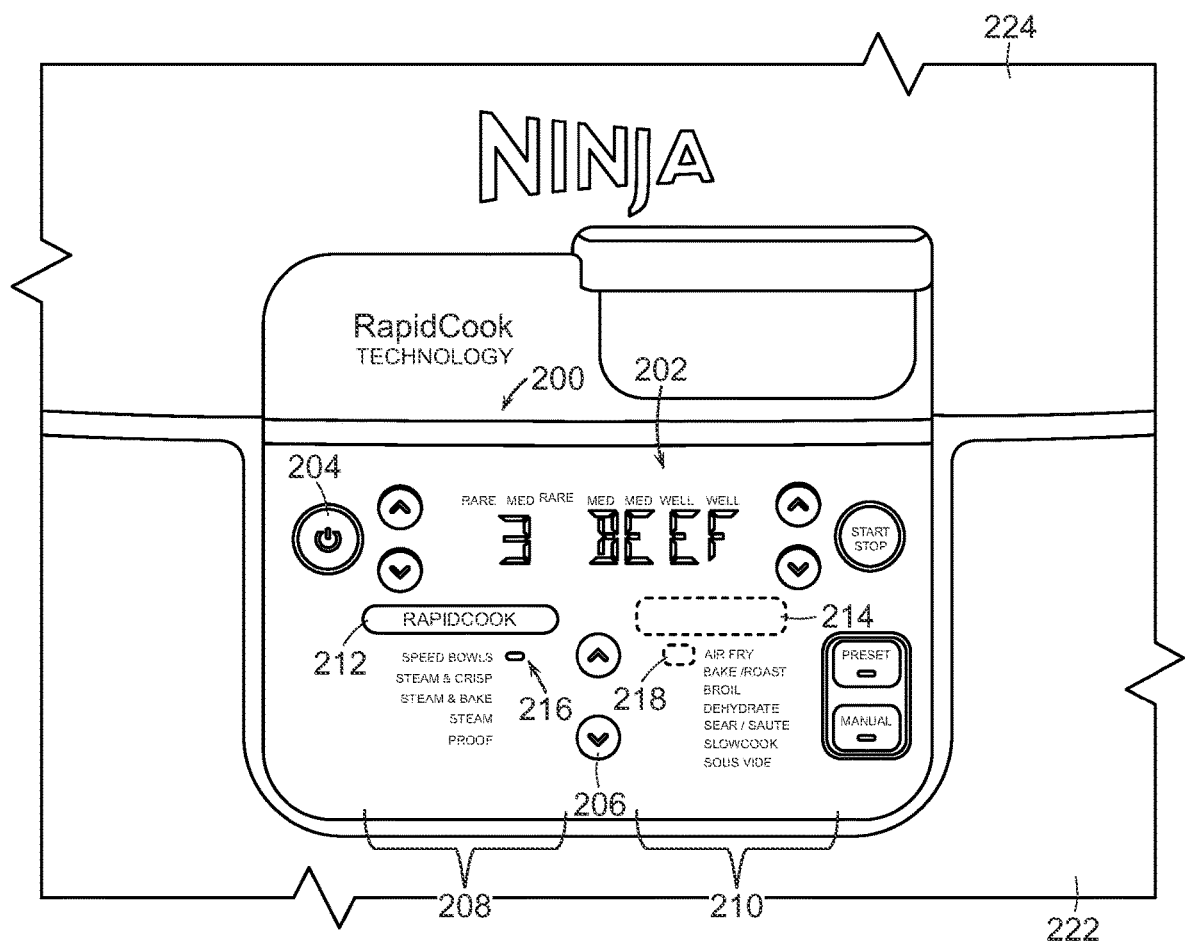
FIG. 15 is front view of a cooking system having a user interface.

As stated previously, the switching mechanism 130 may be used to select a mode or cooking operation of the cooking system 120. In one aspect, the functionality of the user interface of the control panel 60, and therefore the inputs available to a user, may vary in response to the position of the switching mechanism 130 and/or in response to the configuration of the piston 133, which may be controlled by the switching mechanism 130. A detailed view of one embodiment of a control panel 60 is illustrated in FIG. 15. In one aspect, one or more inputs of the control panel 200 may be activated when the switching mechanism 130 is in the first position associated with a first cooking mode such as a steaming cooking mode, and one or more different inputs may be activated when the switching mechanism 130 is in the second position associated with a second cooking mode, such as an air frying mode. As explained above, a sensor, such as a reed switch, Hall Effect sensor, or the like, may be mounted within the lid 124 to indicate to the processor 72 the position of the switching mechanism 130 and the piston 133, and in response, a respective portion of the user interface 200 will be energized for selection by a user.

As illustrated in FIG. 15, the user interface 200 can be arranged on a base 222 and/or a lid 224 of a cooking system. The user interface 200 generally includes a display 202, a power button 204, input buttons 206, a first interface 208, and a second interface 210. The first interface includes an indicator display 212 which is illuminated when the switching mechanism 130 is in a first positon. The first interface 208 is related to the first cooking mode, and can include options related to the first cooking mode, such as steaming, proofing, and steam and crisp processes. An indicator light 216 is arranged on the first interface 208 and is configured to illuminate a choice selected by a user through the input buttons 206. When the first interface 208 is activated, the indicator display 212 is illuminated to inform a user that they can operate the cooking system in a first cooking mode. Similar to the first interface 208, the second interface 210 is related to the second cooking mode, and can include options related to the second cooking mode, such as air frying, baking, roasting, searing, and slow cooking processes. An indicator light 218, which is not illuminated in FIG. 15, is arranged on the second interface 210 and is configured to illuminate a choice selected by a user through the input buttons 206. When the second interface 210 is activated, the indicator display 214 is illuminated to inform a user that they can operate the cooking system in a second cooking mode. In an aspect, the input buttons 206 only function with the interface 208, 210 that is activate due to the position of the switching mechanism 130.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A cooking system for cooking food, the cooking system comprising:
 a housing having a hollow interior defining a cooking chamber;
 a heating element mounted within the housing;
 a vent tube arranged within the housing and communicating between the cooking chamber and an external environment, the vent tube comprising:
  an inlet channel;
  an outlet channel; and
  a central channel arranged between the inlet channel and the outlet channel; and
 a piston arranged within the central channel and configured to alternate between a venting and a non-venting position such that, in the venting position, a low-moisture fluid is drawn through the inlet channel into the cooking chamber from the external environment, and a high-moisture fluid is evacuated through the outlet channel into the external environment from the cooking chamber.

2. The cooking system of claim 1, wherein the low-moisture fluid is drawn into the vent tube in a first direction, and the high-moisture fluid is evacuated through the vent tube in a second direction, the first direction being different than the second direction.

3. The cooking system of claim 2, wherein the inlet channel is arranged on an opposite side of the vent tube relative to the outlet channel.

4. The cooking system of claim 1, wherein the low-moisture fluid passing through an inlet opening of the inlet channel is perpendicular to the high-moisture fluid passing through the outlet channel.

5. The cooking system of claim 1, wherein an inlet opening of the inlet channel is positioned non-adjacent to the outlet channel.

6. The cooking system of claim 1, wherein a plate is connected to an end of the piston.

7. The cooking system of claim 6, wherein the cooking system is operable in a plurality of cooking modes including a first cooking mode and a second cooking mode, wherein the first cooking mode is a wet cooking mode and the second cooking mode is a dry cooking mode.

8. The cooking system of claim 7, wherein in the first cooking mode, the plate contacts a sealing member arranged on an internal surface of the housing.

9. The cooking system of claim 7, wherein in the second cooking mode, a gap is arranged between the plate and a sealing member arranged on an internal surface of the housing.

10. The cooking system of claim 7, wherein in the first cooking mode, the cooking system is operable as a steam cooker.

11. The cooking system of claim 7, wherein in the second cooking mode, the heating element heats a flow of air circulating within the cooking chamber.

12. The cooking system of claim 7, wherein in the second cooking mode, the cooking system is operable as an air fryer.

13. The cooking system of claim 7, wherein said heating element is operable in both the first cooking mode and the second cooking mode.

14. The cooking system of claim 1, wherein the housing includes a lid and a base, the lid movable relative to the base, wherein the lid and the base cooperate to form the cooking chamber.

15. The cooking system of claim 14, wherein the vent tube is arranged within the lid.

16. A cooking system for cooking food, the cooking system comprising:
 a housing having an internal volume;
 an inlet channel and an outlet channel communicating between the internal volume and an external environment; and
 a piston positioned between the inlet channel and the outlet channel and configured to alternate between a venting position where the inlet channel is open such that a first fluid from the external environment is drawn through the inlet channel into the internal volume, and a second fluid from the internal volume is drawn through the outlet channel into the external environment, and a non-venting position where the inlet channel is sealed.

17. The cooking system of claim 16, wherein in the non-venting position, the piston abuts a portion of the outlet channel.

* * * * *